US012513009B2

(12) United States Patent
Yin et al.

(10) Patent No.: US 12,513,009 B2
(45) Date of Patent: Dec. 30, 2025

(54) DOMAIN NAME SYSTEM REQUEST INFORMATION PROCESSING METHOD

(71) Applicant: ZTE CORPORATION, Shenzhen (CN)

(72) Inventors: Qin Yin, Shenzhen (CN); Guojun Tao, Shenzhen (CN); Chuanyang Miao, Shenzhen (CN); Hao Tong, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 221 days.

(21) Appl. No.: 18/547,070

(22) PCT Filed: Jun. 16, 2022

(86) PCT No.: PCT/CN2022/099220
§ 371 (c)(1),
(2) Date: Aug. 18, 2023

(87) PCT Pub. No.: WO2022/267977
PCT Pub. Date: Dec. 29, 2022

(65) Prior Publication Data
US 2024/0056318 A1    Feb. 15, 2024

(30) Foreign Application Priority Data
Jun. 25, 2021  (CN) .......................... 202110712488.0

(51) Int. Cl.
*H04L 9/40*  (2022.01)
*H04L 9/32*  (2006.01)
*H04L 61/4511*  (2022.01)

(52) U.S. Cl.
CPC .............. *H04L 9/40* (2022.05); *H04L 9/3247* (2013.01); *H04L 61/4511* (2022.05)

(58) Field of Classification Search
CPC ..... H04L 9/40; H04L 9/3247; H04L 61/4511; H04L 9/0643; H04L 9/0891; H04L 9/0894; H04L 61/4552; H04L 63/0428
See application file for complete search history.

(56) References Cited

U.S. PATENT DOCUMENTS 6,961,783 B1 * 11/2005 Cook .................. H04L 63/0236
709/227
9,525,660 B2 * 12/2016 Martini .................. H04L 61/10
(Continued)

FOREIGN PATENT DOCUMENTS

| CN | 103825969 A | 5/2014 |
| CN | 105959433 A | 9/2016 |

OTHER PUBLICATIONS

Lu, Chaoyi, et al. "An end-to-end, large-scale measurement of dns-over-encryption: How far have we come?." Proceedings of the Internet Measurement Conference. 2019.*
(Continued)

*Primary Examiner* — Jimmy H Tran
(74) *Attorney, Agent, or Firm* — Vivacqua Crane, PLLC

(57) ABSTRACT

Disclosed are an information processing method, an intermediate resolver, a network device and a non-transitory computer-readable storage medium. The information processing method may include: receiving first Domain Name System (DNS) request information; obtaining, according to the first DNS request information, second DNS request information comprising ciphertext sensitive information and first ciphertext marking information for indicating the ciphertext sensitive information being ciphertext information; and sending the second DNS request information to an authoritative DNS server, so that the authoritative DNS server performs information processing according to the ciphertext sensitive information and the first ciphertext marking information.

20 Claims, 9 Drawing Sheets

(56) References Cited

U.S. PATENT DOCUMENTS

| | | | |
|---|---|---|---|
| 10,680,806 B1* | 6/2020 | Kaliski, Jr. | H04L 9/3226 |
| 10,911,420 B2* | 2/2021 | Martini | H04L 61/103 |
| 11,336,692 B1* | 5/2022 | McCorkendale | H04L 63/1441 |
| 11,924,180 B2* | 3/2024 | Martini | H04L 41/00 |
| 2004/0083306 A1* | 4/2004 | Gloe | H04L 61/5038 |
| | | | 707/999.107 |
| 2014/0310526 A1* | 10/2014 | Pahl | H04L 63/0442 |
| | | | 713/171 |
| 2015/0180653 A1* | 6/2015 | Nix | H04L 9/0841 |
| | | | 380/259 |
| 2015/0288514 A1* | 10/2015 | Pahl | H04L 63/166 |
| | | | 713/171 |
| 2016/0197898 A1* | 7/2016 | Hozza | H04L 63/1466 |
| | | | 713/168 |
| 2016/0315767 A1* | 10/2016 | Pahl | H04L 9/3268 |
| 2017/0093802 A1* | 3/2017 | Norum | H04L 63/0428 |
| 2017/0111179 A1* | 4/2017 | Gero | H04L 9/3013 |
| 2017/0222974 A1* | 8/2017 | Cathrow | H04L 63/06 |
| 2017/0339130 A1* | 11/2017 | Reddy | H04L 63/0823 |
| 2017/0346853 A1* | 11/2017 | Wyatt | H04L 43/12 |
| 2019/0140843 A1* | 5/2019 | Pahl | H04L 63/164 |
| 2019/0364026 A1* | 11/2019 | Martini | H04L 61/4511 |
| 2020/0021446 A1* | 1/2020 | Roennow | H04L 9/0819 |
| 2020/0053072 A1* | 2/2020 | Glozman | H04W 12/08 |
| 2020/0280549 A1* | 9/2020 | Kaliski, Jr. | H04L 9/0822 |
| 2020/0396072 A1* | 12/2020 | Maurer | G06F 16/2379 |
| 2021/0029074 A1 | 1/2021 | Buck et al. | |
| 2021/0092595 A1* | 3/2021 | Ramachandran | H04W 12/037 |
| 2021/0112040 A1* | 4/2021 | Niemi | H04L 63/0485 |
| 2021/0176079 A1* | 6/2021 | Prince | H04L 9/3268 |
| 2021/0218560 A1* | 7/2021 | Nix | H04L 9/3252 |
| 2021/0234846 A1* | 7/2021 | Martini | H04L 61/10 |
| 2021/0281667 A1* | 9/2021 | Garcia-Luna-Aceves | |
| | | | H04L 9/0833 |
| 2021/0377016 A1* | 12/2021 | Perlman | H04L 9/0891 |
| 2022/0006797 A1* | 1/2022 | Lehtikuja | H04L 63/062 |
| 2022/0021650 A1* | 1/2022 | Moore | H04L 63/20 |
| 2022/0094661 A1* | 3/2022 | Woodworth | H04L 63/1441 |
| 2022/0131709 A1* | 4/2022 | Nix | H04L 9/3252 |
| 2022/0140996 A1* | 5/2022 | Cebere | G06F 16/2255 |
| | | | 713/159 |
| 2022/0191164 A1* | 6/2022 | Stolbikov | G06N 7/01 |
| 2022/0278833 A1* | 9/2022 | Nix | H04L 9/0618 |
| 2022/0303251 A1* | 9/2022 | Wang | H04L 63/0281 |
| 2022/0385474 A1* | 12/2022 | Helfinstine | H04L 9/40 |
| 2022/0407855 A1* | 12/2022 | Konda | H04L 9/0838 |
| 2023/0164191 A1* | 5/2023 | Williams | H04L 9/3234 |
| | | | 726/1 |
| 2023/0370423 A1* | 11/2023 | Muñoz De La Torre Alonso | |
| | | | H04L 63/0236 |
| 2024/0163269 A1* | 5/2024 | Kaliski, Jr. | H04L 9/085 |
| 2024/0349053 A1* | 10/2024 | Nix | H04L 9/0643 |

OTHER PUBLICATIONS

Hoang, Nguyen Phong, et al. "K-resolver: towards decentralizing encrypted DNS resolution." arXiv preprint arXiv:2001.08901 (2020).*

Patsakis, Constantinos, Fran Casino, and Vasilios Katos. "Encrypted and Covert DNS Queries for Botnets: Challenges and Countermeasures." arXiv e-prints (2019): arXiv-1909.*

Singanamalla, Sudheesh, et al. "Oblivious dns over https (odoh): A practical privacy enhancement to dns." arXiv preprint arXiv: 2011.10121 (2020).*

Schmitt, Paul, Anne Edmundson, and Nick Feamster. "Oblivious DNS: Practical privacy for DNS queries." arXiv preprint arXiv: 1806.00276 (2018).*

Zhu, Liang, et al. "Connection-oriented DNS to improve privacy and security." 2015 IEEE symposium on security and privacy. IEEE, 2015.*

Siby, Sandra, et al. "Encrypted dns--> privacy? a traffic analysis perspective." arXiv preprint arXiv:1906.09682 (2019).*

International Searching Authority. International Search Report and Written Opinion for PCT Application No. PCT/CN2022/099220 and English translation, mailed Aug. 29, 2022, pp. 1-10.

European Patent Office. Extended European Search Report for EP Application No. 22827472.6, mailed May 27, 2025, pp. 1-12.

International Telecommunication Union Telecommunication Standardization Sector. "H.MCDN-CRRS 'Functional architecture of Content Request Routing Service in MCDN' (New): Output draft," SG16-TD434/WP1, Apr. 2021. pp. 1-23.

Schmitt, P., et al. "Oblivious DNS: Practical Privacy for DNS Queries," arXiv:1806.00276v2, Dec. 2018, pp. 1-17.

* cited by examiner

DOMAIN NAME SYSTEM REQUEST INFORMATION PROCESSING METHOD

CROSS-REFERENCE TO RELATED APPLICATION

This application is a national stage filing under 35 U.S.C. § 371 of international application number PCT/CN2022/099220, filed Jun. 16, 2022, which claims priority to Chinese patent application No. 202110712488.0 filed Jun. 25, 2021. The contents of these applications are incorporated herein by reference in their entirety.

TECHNICAL FIELD

The present disclosure relates to the technical field of information processing, and in particular to an information processing method, an intermediate resolver, a network device and a non-transitory computer-readable storage medium.

BACKGROUND

A Domain Name System (DNS) is an extremely widely used system for resolving address-to-name mapping on the Internet. A user can obtain a real Internet Protocol (IP) address of a target server by querying a domain name server, which helps the user to establish a link with the target server.

In related technologies, when initiating a DNS request for acquiring an IP address of a domain name field, a user equipment (UE) may first send DNS request information to an intermediate resolver. In order to provide more accurate attribution judgment, the intermediate resolver may include sensitive information that can identify the location, identity or the like of the UE or a near-end service node as additional information in the DNS request information. However, this will expose the sensitive information in the DNS request information transmitted in a network to security risks. In order to deal with the security risks, the existing DNS security protection requires encryption of each field in the entire DNS request information, with the purpose of preventing a forged feedback message from an intermediate attacker and maintaining the integrity of data. However, this has no good protection against sensitive data leakage. Moreover, the existing security technologies require all devices to have a trust mechanism for supporting encryption processing and decryption processing on the DNS request information, which leads to an increase in network resource overhead and maintenance costs of the devices.

SUMMARY

The following is an overview of the subject described in detail herein, which is not intended to limit the scope of the claims.

Embodiments of the present disclosure provide an information processing method, an intermediate resolver, a network device and a non-transitory computer-readable storage medium, which can reduce the network resource overhead while preventing the exposure of sensitive information to security risks, thereby reducing maintenance costs of the devices.

In accordance with a first aspect of the present disclosure, the information processing method, which is applied to an intermediate resolver, includes:
receiving first Domain Name System (DNS) request information;
obtaining second DNS request information according to the first DNS request information, where the second DNS request information includes ciphertext sensitive information, and first ciphertext marking information used to indicate that the ciphertext sensitive information is ciphertext information; and
sending the second DNS request information to an authoritative DNS server, so that the authoritative DNS server performs information processing according to the ciphertext sensitive information and the first ciphertext marking information.

In accordance with a second aspect of the present disclosure, the intermediate resolver includes a memory, a processor, and a computer program stored in the memory and executable by the processor. The computer program, when executed by the processor, causes the processor to implement the information processing method as described above.

In accordance with a third aspect of the present invention, the network device includes the intermediate resolver as described above.

In accordance with a fourth aspect of the present invention, the non-transitory computer-readable storage medium storing a computer-executable instruction which, when executed by a processor, causes the processor to implement the information processing method as described above.

An embodiment of the present disclosure includes: receiving first DNS request information; obtaining second DNS request information according to the first DNS request information, where the second DNS request information includes ciphertext sensitive information, and first ciphertext marking information used to indicate that the ciphertext sensitive information is ciphertext information; and sending the second DNS request information to an authoritative DNS server, so that the authoritative DNS server performs information processing according to the ciphertext sensitive information and the first ciphertext marking information.

An embodiment of the present disclosure includes: receiving first DNS request information; obtaining second DNS request information according to the first DNS request information, where the second DNS request information includes ciphertext sensitive information, and first ciphertext marking information used to indicate that the ciphertext sensitive information is ciphertext information; and sending the second DNS request information to an authoritative DNS server, so that the authoritative DNS server performs information processing according to the ciphertext sensitive information and the first ciphertext marking information. According to a scheme of the embodiment of the present disclosure, by converting the first DNS request information into the second DNS request information including the ciphertext sensitive information and the first ciphertext marking information, it is not required to perform encryption processing on the entire first DNS request information, so that the network resource overhead can be reduced while preventing the exposure of sensitive information to security risks, thereby reducing maintenance costs of the devices.

Other features and advantages of the present disclosure will be set forth in the following description, and partly become obvious from the description, or understood by implementing the present disclosure. The objects and other advantages of the present disclosure can be realized and obtained by the structure particularly pointed out in the description, claims and drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, and do not constitute a limitation to the technical schemes of the present disclosure.

DETAILED DESCRIPTION

In order to make the objects, technical schemes and advantages of the present disclosure clear, the present disclosure will be further described in detail in conjunction with the drawings and embodiments. It should be understood that the specific embodiments described here are only used to illustrate the present disclosure, and are not intended to limit the present disclosure.

It should be noted that, logical orders have been shown in the flowcharts, in some cases, the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

The present disclosure provides an information processing method, an intermediate resolver, a network device and a storage medium. When first domain name system (DNS) request information is received, the first DNS request information is converted into second DNS request information including ciphertext sensitive information and first ciphertext marking information, and then the second DNS request information is sent to an authoritative DNS server, so that the authoritative DNS server performs information processing according to the ciphertext sensitive information and the first ciphertext marking information. That is to say, in the scheme of the embodiment of the present disclosure, by transmitting the second DNS request information including the ciphertext sensitive information and the first ciphertext marking information, it is not required to perform encryption processing on the entire first DNS request information, so that the network resource overhead can be reduced while preventing the exposure of sensitive information to security risks, thereby reducing maintenance costs of devices. In addition, since the first ciphertext marking information is used to indicate that the ciphertext sensitive information is ciphertext information, the authoritative DNS server can appropriately decrypt the ciphertext sensitive information according to the first ciphertext marking information, so that the processing accuracy of the second DNS request information by the authoritative DNS server can be improved.

The embodiments of the present disclosure will be further elaborated in conjunction with the accompanying figures.

Figure 1:
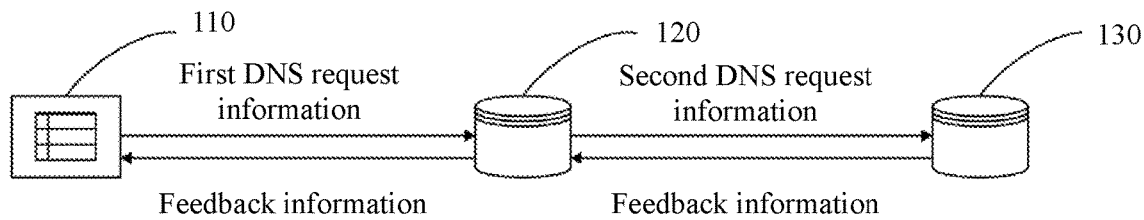
FIG. 1 is a schematic diagram of a system architecture for performing an information processing method provided by an embodiment of the present disclosure.

As shown in FIG. 1, a schematic diagram of a system architecture for performing an information processing method provided by an embodiment of the present disclosure is provided. In an example shown in FIG. 1, the system architecture includes a client device 110, an intermediate resolver 120 and an authoritative DNS server 130. The intermediate resolver 120 is communicatively connected with the client device 110 and the authoritative DNS server 130, respectively.

The intermediate resolver 120 can receive first DNS request information sent by the client device 110. In the case where the first DNS request information carries sensitive information, the intermediate resolver 120 can encrypt the sensitive information in the first DNS request information to obtain second DNS request information carrying ciphertext sensitive information. In the case where the first DNS request information does not carry sensitive information, the intermediate resolver 120 can acquire sensitive information corresponding to the client device 110, encrypt the sensitive information, and generate second DNS request information carrying ciphertext sensitive information according to the first DNS request information. In addition, the second DNS request information also carries first ciphertext marking information used to indicate that the ciphertext sensitive information is ciphertext information. Additionally, the intermediate resolver 120 can also send the second DNS request information to the authoritative DNS server 130, so that the authoritative DNS server 130 can perform related information processing according to the ciphertext sensitive information and the first ciphertext marking information. In addition, the intermediate resolver 120 can also acquire feedback information including feedback type information and second ciphertext marking information from the authoritative DNS server 130. The intermediate resolver 120 can forward the feedback information to the client device 110 according to the feedback type information and the second ciphertext marking information, or reconstruct new DNS request information and send the new DNS request information to the authoritative DNS server 130, so that the authoritative DNS server 130 reprocesses the new DNS request information.

The system architecture and application scenarios described in the embodiments of the present disclosure are intended to illustrate the technical schemes in the embodiments of the present disclosure more clearly, and are not intended to limit the technical schemes provided by the embodiments of the present disclosure. Those having ordinary skills in the art know that, with the evolution of system architectures and the emergence of new application scenarios, the technical schemes provided by the embodiments of the present disclosure are also applicable to similar technical problems.

Those having ordinary skills in the art can understand that the system architecture shown in FIG. 1 does not constitute a limitation to the embodiment of the present disclosure and may include more or less components than shown, or a combination of some components, or a different arrangement of components.

Based on the above system architecture, various embodiments of the data processing method of the present disclosure are proposed below.

Figure 2:
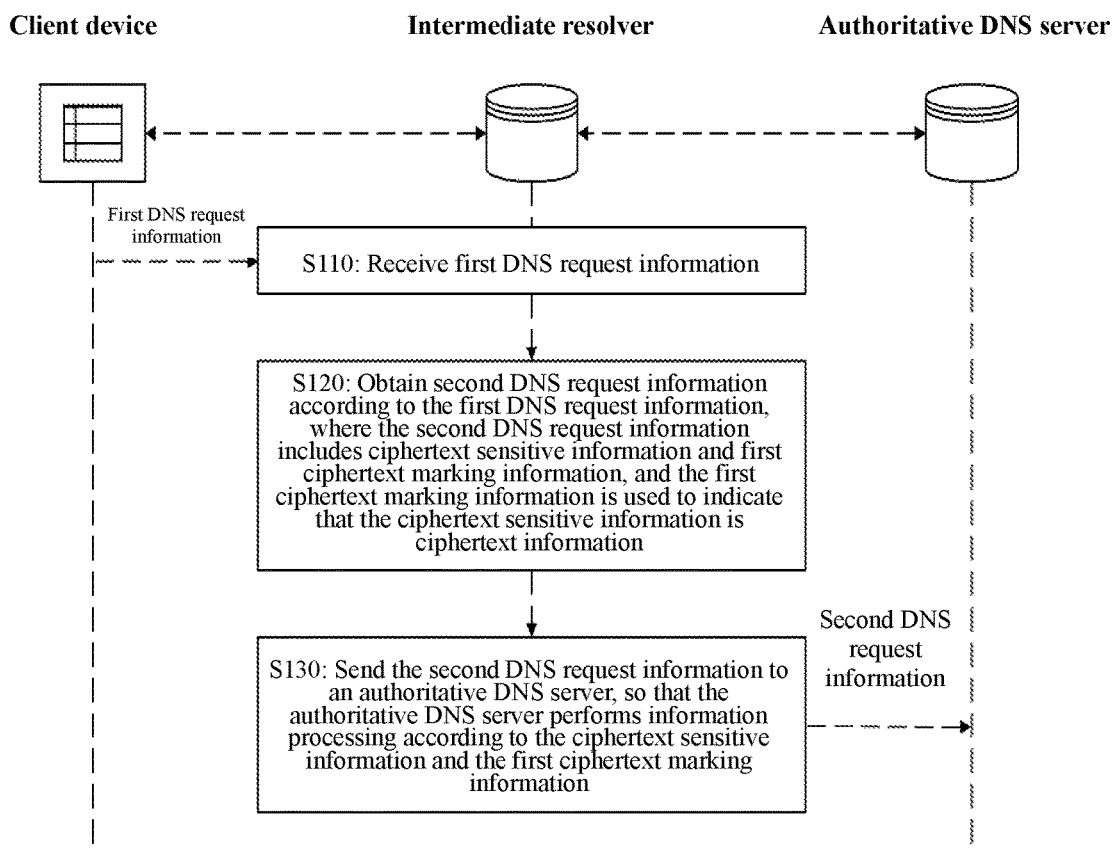
FIG. 2 is a flowchart of an information processing method provided by an embodiment of the present disclosure.

As shown in FIG. 2, a flowchart of an information processing method provided by an embodiment of the present disclosure is provided. The information processing method may be applied to an intermediate resolver, such as the intermediate resolver 120 in the system architecture shown in FIG. 1. The information processing method may include, but not limited to, steps S110, S120 and S130.

At S110, first DNS request information is received.

In this step, the first DNS request information is used to request a mapping relationship between a domain name and an Internet Protocol (IP) address. An initiator of the first DNS request information includes, but not limited to, a client device that needs to acquire the mapping relationship between the domain name and the IP address. A receiver of the first DNS request information includes, but not limited to, an Internet service provider device and an intermediate resolver.

In an embodiment, the first DNS request information may carry sensitive information corresponding to a sender of the first DNS request information, and the sensitive information may be configured to characterize an IP address corresponding to the sender or a hardware identification code corresponding to a sender device.

In an embodiment, the first DNS request information may include EDNS Client Subnet (ECS) option information carrying sensitive information. In an embodiment, the first DNS request information is generated based on a message body structure defined by an Extension Mechanisms for DNS (EDNS) protocol, such as IETF RFC 6891 protocol, and by some ECS protocols, such as IETF RFC 7871 protocol.

In an embodiment, the first DNS request information is generated by means of a data structure defined by an EDNS protocol with a transfer packet size.

In an embodiment, the first DNS request information is sent after being encapsulated by a User Datagram Protocol (UDP).

At S120, second DNS request information is obtained according to the first DNS request information, where the second DNS request information includes ciphertext sensitive information and first ciphertext marking information, and the first ciphertext marking information is used to indicate that the ciphertext sensitive information is ciphertext information.

In this step, since the first DNS request information is received in S110, first information processing may be performed on the first DNS request information to obtain second DNS request information including ciphertext sensitive information generated by encrypting sensitive information, so that the second DNS request information including the ciphertext sensitive information can be sent to the authoritative DNS server in a subsequent step.

It should be noted that the first DNS request information may or may not carry the sensitive information, which will not be limited in the embodiment of the present disclosure.

It should be noted that performing first information processing on the first DNS request information to obtain second DNS request information may be implemented in different ways, which will not be limited in this embodiment. For example, in the case where the first DNS request information carries sensitive information, the first DNS request information may be divided into various data portions according to various constituents, sensitive information is recognized from these data portions and encrypted to obtain ciphertext sensitive information, and the ciphertext sensitive information and other data in the first DNS request information are combined to form second DNS request information. For another example, sensitive information may be recognized from the first DNS request information, the recognized sensitive information is encrypted to obtain ciphertext sensitive information, and the sensitive information in the first DNS request information is updated to ciphertext sensitive information to obtain second DNS request information. Recognizing sensitive information from various data portions of the first DNS request information, or directly recognizing sensitive information from the first DNS request information may be performed based on a predefined recognition rule or may be performed based on an intelligent analysis process, which will not be limited in this embodiment. For example, when recognition is performed based on the predefined recognition rule, the predefined recognition rule defines which fields of which tables belong to sensitive information; and when recognition is performed based on the intelligent analysis process, it can be determined automatically whether data belong to sensitive information according to the specific content of the data. For another example, in the case where the first DNS request information does not carry sensitive information, a receiver of the first DNS request information, such as the intermediate resolver, may generate sensitive information corresponding to the receiver, encrypt the sensitive information to obtain ciphertext sensitive information, and then combine the ciphertext sensitive information with other data in the first DNS request information to form second DNS request information, or update the sensitive information in the first DNS request information to ciphertext sensitive information to obtain the second DNS request information.

In an embodiment, the first DNS request information is based on EDNS-based information defined in the RFC6891 protocol, and in the second DNS request information, a TTL element and a RDATA element in a message body structure defined by the RFC6891 protocol are extended.

Figure 3:
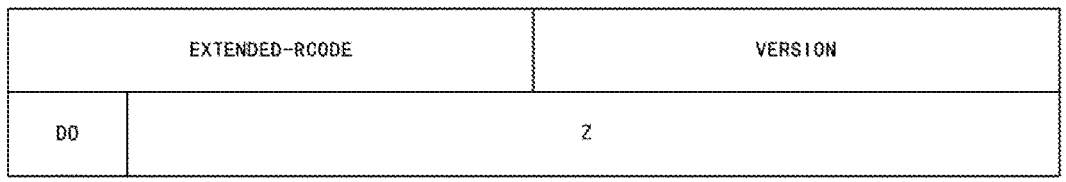
FIG. 3 is a schematic diagram of a message body substructure provided by an embodiment of the present disclosure.

As shown in FIG. 3, a schematic diagram of a message body substructure provided by an embodiment of the present disclosure is provided. Referring to FIG. 3, the TTL element in the message body structure defined by the RFC6891 protocol is extended in the embodiment of the present disclosure. A message body substructure of the TTL element includes an OPTION-CODE field, an OPTION-LENGTH field and an EXTENDED-RCODE field. The EXTENDED-RCODE field is used to indicate that the DNS request information is extended, and an extended return message type is adopted. The combination of this field and the RCODE field in a header field of the DNS request information may represent more types other than an ordinary DNS return message. For example, if the EXTENDED-RCODE field and the RCODE field are combined into 0x1, it indicates that this DNS request information adopts the extended return message type in the embodiment of the present disclosure. In addition, when the EXTENDED-RCODE field is 0, it indicates that the extended return message type is not adopted. Therefore, the EXTENDED-RCODE field in the embodiment of the present disclosure needs to be assigned a non-zero value when the DNS request message is generated.

It should be noted that in the embodiment of the present disclosure, only the EXTENDED-RCODE field in the message body substructure of the TTL element is extended, and the message body structure defined by the RFC6891 protocol is not changed, thus ensuring compatibility.

Figure 4:
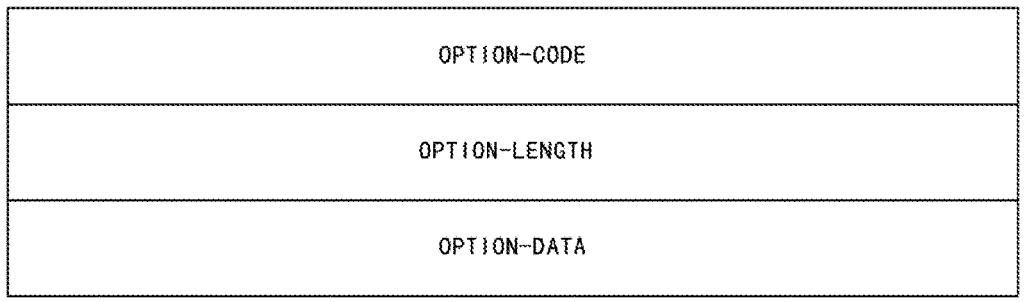
FIG. 4 is a schematic diagram of another message body substructure provided by an embodiment of the present disclosure.

FIG. 4 is a schematic diagram depicting another message body substructure provided by an embodiment of the present disclosure, as shown in FIG. 4, in the embodiment of the present disclosure, a message body substructure of the RDATA element in the message body structure defined by the RFC6891 protocol includes an OPTION-DATA field which may contain a plurality of additional information, and in the embodiment of the present disclosure, the OPTION-DATA field is extended.

Figure 5:
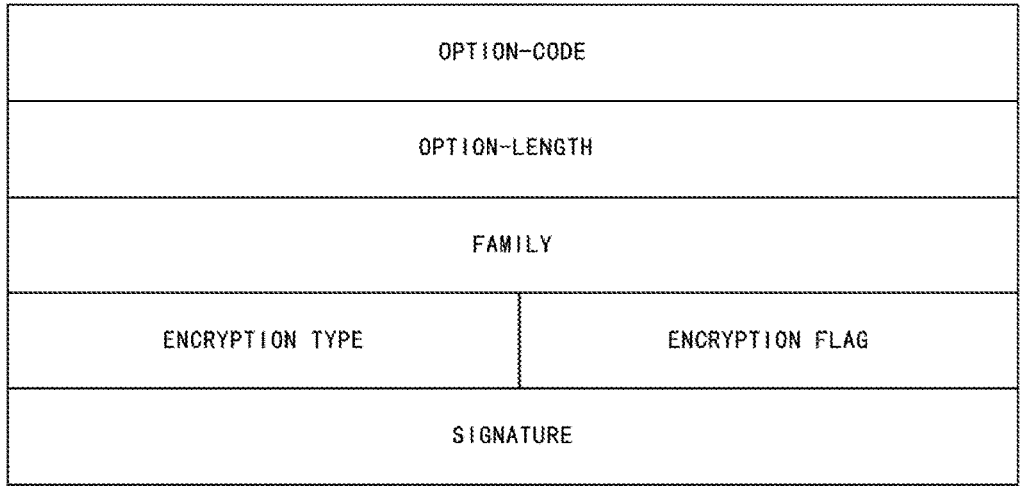
FIG. 5 is a schematic diagram of an expanded message body substructure of a RDATA element in FIG. 4.

FIG. 5 is a schematic diagram depicting an extended message body substructure of the RDATA element shown in FIG. 4. In an example shown in FIG. 5, the extended OPTION-DATA field includes a FAMILY field, an ENCRYPTION TYPE field, an ENCRYPTION FLAG field and a SIGNATURE field. In the embodiment of the present disclosure, the type of the message body substructure is defined as a Pseudo Address (PADR) type, and a set of the FAMILY field, the ENCRYPTION TYPE field, the ENCRYPTION FLAG field and the SIGNATURE field is defined as a PADR field.

The OPTION-CODE field in the message body substructure of the RDATA element is used to indicate whether the DNS request information carries encrypted ciphertext sensitive information in the embodiment of the present disclosure, that is, whether the DNS request information carries a pseudo address obtained by encrypting an IP address of the client device or an IP address of the intermediate resolver.

The OPTION-LENGTH field is used to indicate a length of the entire OPTION-DATA field.

The FMAILY field is used to indicate the type of the ciphertext sensitive information carried in the DNS request information. For example, when the ciphertext sensitive information is an encrypted Internet Protocol version 4 (IPv4) address, the FMAILY field is assigned a value of 1, and when the ciphertext sensitive information is an encrypted Internet Protocol version 6 (IPv6) address, the FMAILY field is assigned a value of 2.

The ECRYPTION TYPE field is used to indicate the type of an encryption algorithm adopted to encrypt the sensitive information. For example, when the sensitive information is not encrypted, the ECRYPTION TYPE field is assigned a value of 0, when the Message-Digest Algorithm 5 (MD5) is adopted to encrypt the sensitive information, the ECRYPTION TYPE field is assigned a value of 1, and when the Secure Hash Algorithm 1 (SHA-1) is adopted, the CRYPTION TYPE field is assigned a value of 2.

The ECRYPTION FLAG field represents whether the encrypted sensitive information has passed verification. For example, the intermediate resolver can determine whether the authoritative DNS server have successfully decrypted the ciphertext sensitive information through whether the CRYPTION FLAG field in the feedback information sent by the authoritative DNS server to the intermediate resolver changes.

The SIGNATURE field is used to store a character string generated after encrypting the information that needs to be secured. For example, the SIGNATURE field may store ciphertext sensitive information or may be used to store a key adopted when encrypting the sensitive information.

In addition, in structure the message body the RDATA element may further include ECS option information, and the ECS option information may also be used to store ciphertext sensitive information.

It should be noted that the ECS option information immediately follows or precedes the end of a previous message body in the DNS request information, and the position of the PADR field may be variable.

In an embodiment, when the DNS request information is provided with both a PADR field and ECS option information, the PADR field and the ECS option information are set adjacent to each other.

In an embodiment, when the ciphertext sensitive information is stored in the SIGNATURE field of the DNS request information, the ECS option information may not be set, or the ECS option information may be assigned a value of 0.

At S130, the second DNS request information is sent to the authoritative DNS server, so that the authoritative DNS server performs information processing according to the ciphertext sensitive information and the first ciphertext marking information.

In this step, since the second DNS request information including ciphertext sensitive information and first ciphertext marking information is obtained in S120, the second DNS request information may be sent to the authoritative DNS server, so that the authoritative DNS server can perform data processing according to the ciphertext sensitive information and the first ciphertext marking information. Since encryption processing is not performed on the entire first DNS request information in the embodiment of the present disclosure, and the sensitive information can be encrypted separately to obtain second DNS request information carrying ciphertext sensitive information so as to secure the sensitive information, the network resource overhead can be reduced while preventing the exposure of sensitive information to security risks, thereby reducing maintenance costs of the devices. In addition, since the first ciphertext marking information is used to indicate that the ciphertext sensitive information is ciphertext information, the authoritative DNS server can perform appropriate decryption processing on the ciphertext sensitive information according to the first ciphertext marking information, so that the processing accuracy of the second DNS request information by the authoritative DNS server can be improved.

It should be noted that the authoritative DNS server will send a feedback result to the intermediate resolver after performing information processing according to the ciphertext sensitive information and the first ciphertext marking information, and the intermediate resolver can determine whether the authoritative DNS server feds back a correct mapping relationship between the domain name and the IP address according to the feedback result.

In an embodiment, the first DNS request information includes first EDNS additional option information which includes source-end sensitive information. The first EDNS additional option information is generated according to the ECS protocol. The source-end sensitive information includes, but not limited to, the IP address of the client device.

In an embodiment, the first ciphertext marking information is stored in the OPTION-CODE field of the second DNS request information, and in the embodiment of the present disclosure the OPTION-CODE field is used to indicate whether the DNS request information carries encrypted ciphertext sensitive information, that is, indicate whether the DNS request information carries the pseudo address obtained by encrypting the IP address of the client device or the IP address of the intermediate resolver.

Figure 6:
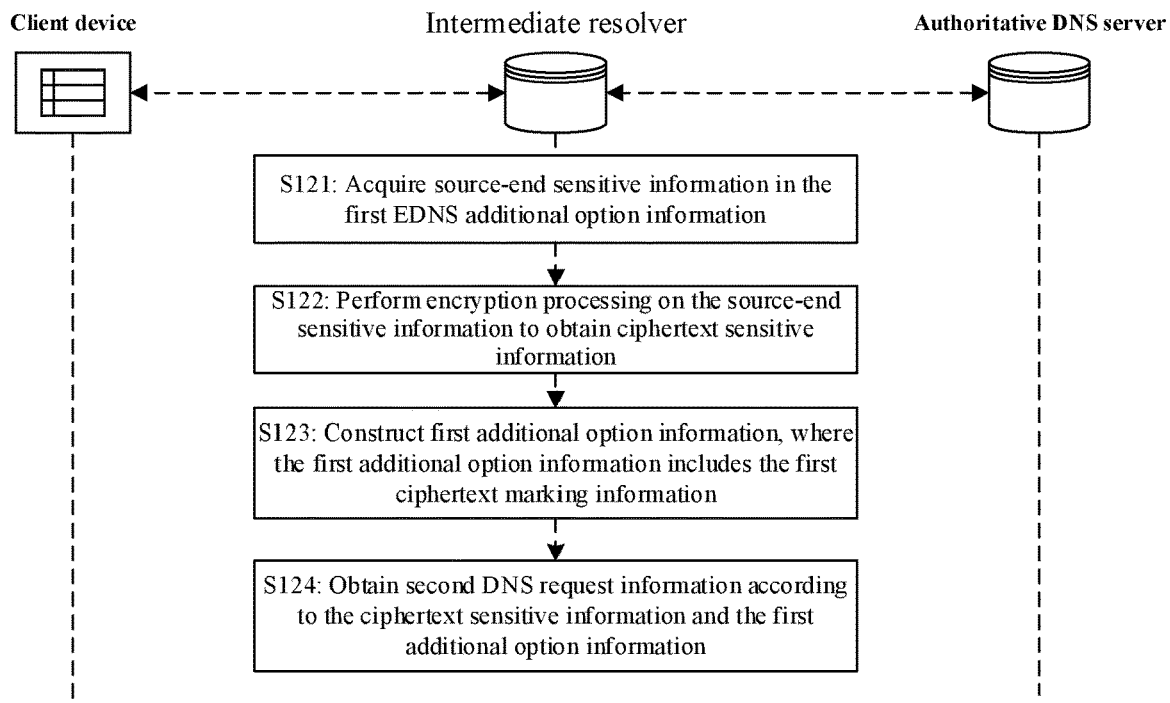
FIG. 6 is a flowchart of an example method of S120 in FIG. 2.

FIG. 6 is a flowchart illustrating example processes of S120 in FIG. 2. As shown in FIG. 6, S120 may include, but not limited to, steps S121, S122, S123, S124 and S125.

At S121, the source-end sensitive information in the first EDNS additional option information is acquired.

In this step, the source-end sensitive information is generated by the client device and then added to the first DNS request information. In an embodiment, the first DNS request information includes the first EDNS additional option information, and the source-end sensitive information is generated by the client device and then added to the first EDNS additional option information. The source-end sensitive information is used to characterize the IP address of the client device.

It should be noted that the first EDNS additional option information may be generated by the client device or may be generated by the intermediate resolver.

It should be noted that the source-end sensitive information does not have to be generated only by the client device. For example, a first intermediate resolver connected to one side of the client device is configured to realize data penetration of the first DNS request information. After acquiring the first DNS request information, the first intermediate resolver may check whether the first DNS request information carries source-end sensitive information. In the case where the first DNS request information does not carry source-end sensitive information, the first intermediate resolver may acquire local sensitive information according to the first DNS request information and send the first DNS request information carrying the local sensitive information to a second intermediate resolver, the local sensitive information being used to replace the source-end sensitive information generated by the client device. After receiving the first DNS request information, the second intermediate resolver performs encryption processing on the local sensitive information in the first DNS request information to obtain ciphertext sensitive information.

In an embodiment, the source-end sensitive information may be stored in the ADDRESS field in the first EDNS additional option information.

In an embodiment, the source-end sensitive information may also be stored in the SIGNATURE field of the first DNS request information.

At S122, encryption processing is performed on the source-end sensitive information to obtain the ciphertext sensitive information.

It should be noted that the encryption algorithm adopted to perform encryption processing on the source-end sensitive information may be a symmetric encryption algorithm, an advanced encryption standard or other encryption algorithms, which may be appropriately selected according to actual application situations, and will not be limited in this embodiment. Symmetric encryption algorithm refers to an encryption algorithm which adopts the same key for encryption and decryption, and the sender and receiver need to agree on a public key prior to conducting secure communication. Advanced encryption standard, also known as Rijndael encryption algorithm, is a block encryption standard, which can support a wider range of blocks and key lengths.

It should be noted that the encryption algorithm or encryption policy and other information adopted to perform encryption processing on sensitive data may be included in the intermediate resolver, or may be obtained by the intermediate resolver from other places, for example, from the authoritative DNS server or from the first DNS request information, which will not be limited in this embodiment.

In an embodiment, the encrypted ciphertext sensitive information is stored in the SIGNATURE field of the PADR field of the second DNS request information.

In an embodiment, the second DNS request information includes ECS option information, and the encrypted ciphertext sensitive information is stored in the ECS option information.

In an embodiment, the second DNS request information includes an ECRYPTION TYPE field which is used to indicate the type of an encryption algorithm adopted to encrypt the sensitive information. For example, when the sensitive information is not encrypted, the ECRYPTION TYPE field is assigned a value of 0, when the MD5 is adopted to encrypt sensitive information, the ECRYPTION TYPE field is assigned a value of 1, and when the SHA-1 is adopted, the CRYPTION TYPE field is assigned a value of 2.

At S123, first additional option information is constructed, where the first additional option information includes the first ciphertext marking information.

In this step, the first additional option information includes first ciphertext marking information which is used to indicate that the ciphertext sensitive information is ciphertext information. After receiving the second DNS request information, the authoritative DNS server first detects whether the second DNS request information carries the first ciphertext marking information, and in the case where the authoritative DNS server detects the first ciphertext marking information, the authoritative DNS server decrypts the ciphertext sensitive information.

In an embodiment, the first additional option information is stored in the message body substructure of the RDATA element of the second DNS request information.

In an embodiment, the ciphertext marking information is stored in the OPTION-CODE field of the second DNS request information.

At S124, the second DNS request information is obtained according to the ciphertext sensitive information and the first additional option information.

In this step, the ciphertext sensitive information and the first additional option information in the first DNS request information are combined to form the second DNS request information. Since encryption processing is not performed on the entire first DNS request information in the embodiment of the present disclosure, and sensitive information can be encrypted separately to obtain second DNS request information carrying ciphertext sensitive information so as to secure the sensitive information, the network resource overhead can be reduced while preventing the exposure of sensitive information to security risks, thereby reducing maintenance costs of the devices. In addition, since the first ciphertext marking information is used to indicate that the ciphertext sensitive information is ciphertext information, the authoritative DNS server can perform appropriate decryption processing on the ciphertext sensitive information according to the first ciphertext marking information, so that the processing accuracy of the second DNS request information by the authoritative DNS server can be improved.

It should be noted that the ciphertext sensitive information and the first additional option information in the embodiment of the present disclosure do not have to be parallel. For example, the ciphertext sensitive information and the first additional option information may be stored in two different fields in the second DNS request information. For another example, the ciphertext sensitive information may be included in the first additional option information, so that the ciphertext sensitive information and the first additional option information can be stored in the same field in the second DNS request information.

In an embodiment, the first additional option information includes a first encryption signature field.

Figure 7:
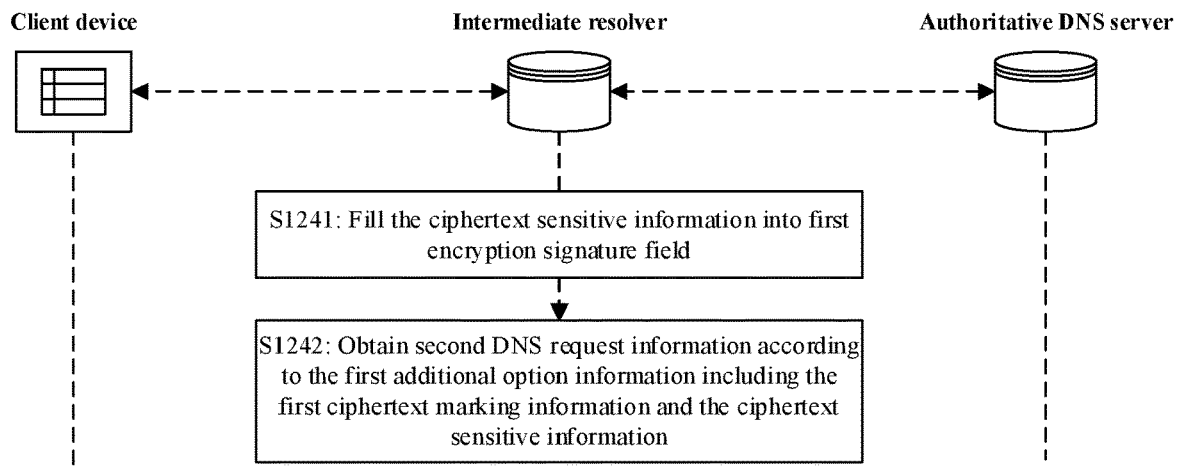
FIG. 7 is a flowchart of an example method of S124 in FIG. 6.

FIG. 7 is a flowchart illustrating example processes of S124 in FIG. 6. S124 may include, but not limited to, steps S1241 and S1242.

At S1241, the ciphertext sensitive information is filled into the first encryption signature field.

In this step, the ciphertext sensitive information is filled into the first encryption signature field, and the first encryption signature field is included in the first additional option information. The first additional option information may be generated according to the ECS option protocol or may be generated according to the ECS protocol. After acquiring the second DNS request information, the authoritative DNS server resolves the second DNS request information to obtain the first additional option information, and acquires the ciphertext sensitive information by detecting the first encryption signature field in the first additional option information.

In an embodiment, the ciphertext sensitive information is filled into the SIGNATURE field of the second DNS request information.

At S1242, the second DNS request information is obtained according to the first additional option information including the first ciphertext marking information and the ciphertext sensitive information.

In this step, after acquiring the second DNS request information, the authoritative DNS server resolves the second DNS request information to obtain the first additional option information, and acquires the ciphertext sensitive information by detecting the first encryption signature field in the first additional option information. In an embodiment, the first ciphertext marking information may also be obtained from the first additional option information.

Figure 8:
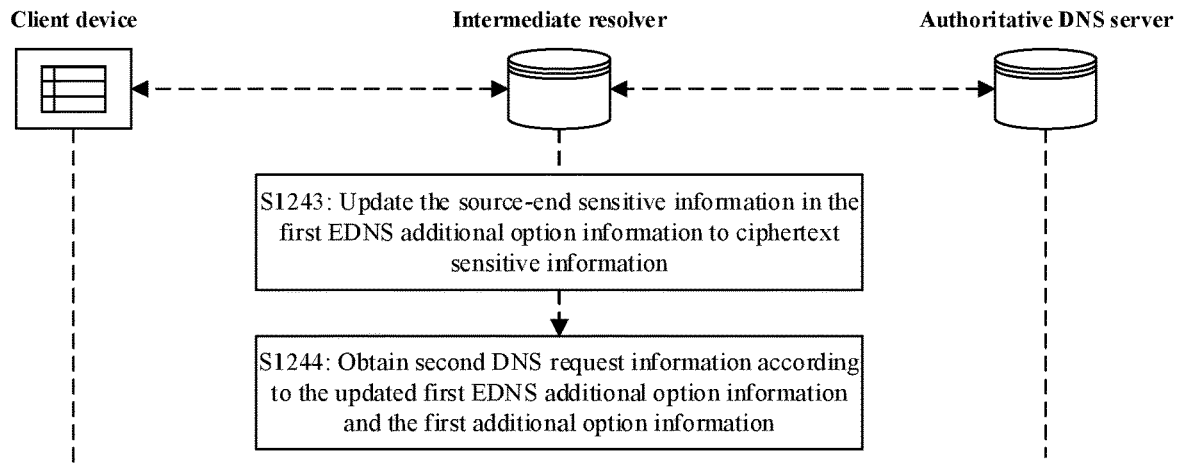
FIG. 8 is a flowchart of another example method of S124 in FIG. 6.

FIG. 8 is a flowchart illustrating another example method of S124 in FIG. 6. S124 may further include, but not limited to, steps S1243 and S1244.

At S1243, the source-end sensitive information in the first EDNS additional option information is updated to the ciphertext sensitive information.

In this step, the source-end sensitive information in the first EDNS additional option information is updated to the ciphertext sensitive information. Therefore, for the second DNS request information, as compared with the first DNS request information, only the source-end sensitive information is encrypted, and the ciphertext sensitive information generated after the source-end sensitive information is encrypted is still included in the first EDNS additional option information. Therefore, encryption is not performed on the entire second DNS request information. As compared with the first DNS request information, the second DNS request information still has the same data structure as the first DNS request information. Therefore, in the scheme of the embodiment of the present disclosure, by transmitting the second DNS request information including the ciphertext sensitive information and the first ciphertext marking information, it is not required to perform encryption processing on the entire first DNS request information, so that the network resource overhead can be reduced while preventing the exposure of sensitive information to security risks, thereby reducing maintenance costs of the devices. In addition, since the first ciphertext marking information is used to indicate that the ciphertext sensitive information is ciphertext information, the authoritative DNS server can perform appropriate decryption processing on the ciphertext sensitive information according to the first ciphertext marking information, so that the processing accuracy of the second DNS request information by the authoritative DNS server can be improved.

In an embodiment, the source-end sensitive information is stored in the SIGNATURE field of the first DNS request information, the source-end sensitive information is encrypted to obtain ciphertext sensitive information, and the ciphertext sensitive information is filled into the SIGNATURE field of the first DNS request information to obtain second DNS request information.

At S1244, second DNS request information is obtained according to the updated first EDNS additional option information and the first additional option information.

In this step, the intermediate resolver obtains the second DNS request information according to the updated first EDNS additional option information and the first additional option information. Since the encrypted ciphertext sensitive information of the source-end sensitive information is still included in the first EDNS additional option information, in the embodiment of the present disclosure, it is not required to perform encryption processing on the entire first DNS request information, so that the network resource overhead can be reduced while preventing the exposure of sensitive information to security risks, thereby reducing maintenance costs of devices. In addition, since the first ciphertext marking information is used to indicate that the ciphertext sensitive information is ciphertext information, the authoritative DNS server can perform appropriate decryption processing on the ciphertext sensitive information according to the first ciphertext marking information, so that the processing accuracy of the second DNS request information by the authoritative DNS server can be improved.

In an embodiment, a key adopted when encrypting sensitive information is stored in the first EDNS additional option information, and the first additional option information includes a SIGNATURE field storing the ciphertext sensitive information. Therefore, the second DNS request information is obtained according to the updated first EDNS additional option information and the first additional option information, where only the sensitive information of the second DNS request information other than the entire information is encrypted.

Figure 9:
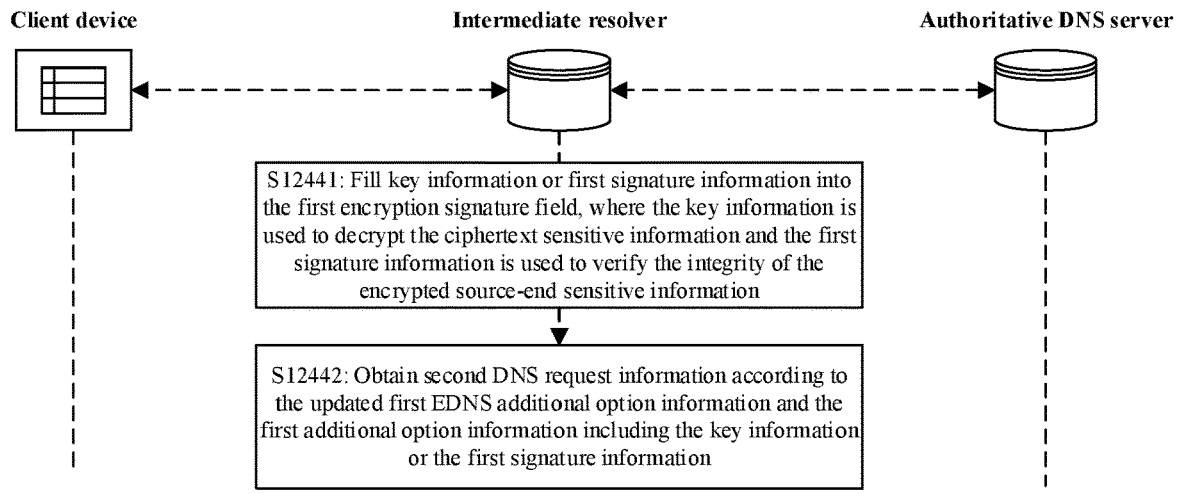
FIG. 9 is a flowchart of an example method of S1244 in FIG. 5.

FIG. 9 is a flowchart illustrating example processes of S1244 in FIG. 5. S1244 may include, but not limited to, steps S12441 and S12442.

At S12441, key information or first signature information is filled into the first encryption signature field, where the key information is used to decrypt the ciphertext sensitive information and the first signature information is used to verify the integrity of the encrypted source-end sensitive information.

In this step, the key information may be a public key adopted when encrypting sensitive information, and the authoritative DNS server can decrypt the ciphertext sensitive information according to the key information. In addition, the key information may also reflect the encryption algorithm adopted when encrypting the sensitive information. The first signature information may be used to verify the encrypted source-end sensitive information to ensure the integrity of the encrypted source-end sensitive information.

In an embodiment, the SIGNATURE field of the second DNS request information may also be used to store the public key adopted when encrypting the sensitive information.

At S12442, second DNS request information is obtained according to the updated first EDNS additional option information and the first additional option information including the key information or the first signature information.

In this step, for the second DNS request information, as compared with the first DNS request information, the first EDNS additional option information and the first additional option information including the key information or the first signature information are updated. Therefore, in the embodiment of the present disclosure, it is not required to perform encryption processing on the entire first DNS request information, so that the network resource overhead can be reduced while preventing the exposure of sensitive information to security risks, thereby reducing maintenance costs of the devices. In addition, since the first ciphertext marking information is used to indicate that the ciphertext sensitive information is ciphertext information, the authoritative DNS server can perform appropriate decryption processing on the ciphertext sensitive information according to the first ciphertext marking information, so that the processing accuracy of the second DNS request information by the authoritative DNS server can be improved.

In an embodiment, the first EDNS additional option information may store the ciphertext sensitive information or may store a key adopted when encrypting the sensitive information, and the first additional option information includes a SIGNATURE field which may store the ciphertext sensitive information or may store a key adopted when encrypting the sensitive information. Therefore, the second DNS request information is obtained according to the updated first EDNS additional option information and the first additional option information, where only the sensitive information of the second DNS request information other than the entire information is encrypted.

Figure 10:
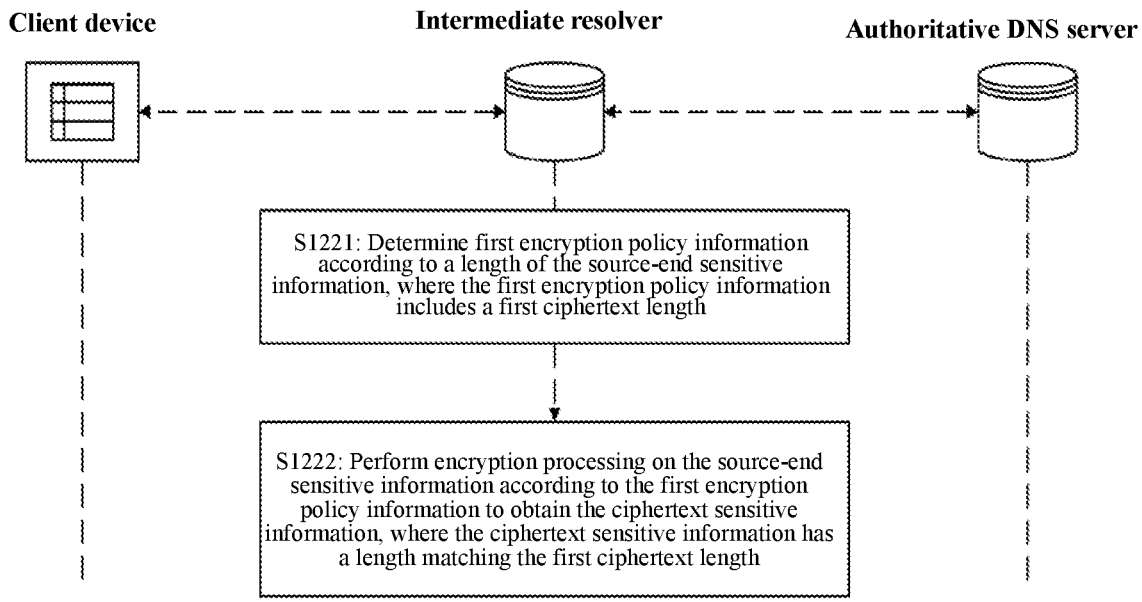
FIG. 10 is a flowchart of an example method of S122 in FIG. 6.

FIG. 10 is a flowchart illustrating example processes of S122 in FIG. 6. S122 may include, but not limited to, steps S1221 and S1222.

At S1221, first encryption policy information is determined according to a length of the source-end sensitive information, where the first encryption policy information includes a first ciphertext length.

In this step, the first encryption policy information is determined according to the information length of the source-end sensitive information. When the source-end sensitive information is an IPv4 address, the intermediate resolver can determine that the source-end sensitive information type is an IPv4 address by detecting the length of the source-end sensitive information, and configure the first encryption policy information as first encryption policy information corresponding to the IPv4 address. When the source-end sensitive information is an IPv6 address, the intermediate resolver can determine that the source-end sensitive information type is an IPv6 address by detecting the length of the source-end sensitive information, and configure the first encryption policy information as first encryption policy information corresponding to the IPv6 address.

In an embodiment, in addition to the first ciphertext length, the first encryption policy information further includes an encryption method for the source-end sensitive information. For example, when the source-end sensitive information corresponds to an IPv4 address, according to the encryption method, domain name fields in the IPv4 form are first extracted from the source-end sensitive information, and then converted into integer real numbers through a character string conversion function. The converted integer real numbers may be limited to 0 to 15 through numerical restriction. Since the encrypted pseudo address is also an IPv4 address, a 32-bit address space needs to be reserved. The converted integer real numbers are further converted into four 4-bit binary numbers with the remaining address space padded with zero, and 8-bit binary numbers are taken from the beginning each time and converted into decimal numbers to obtain the IPv4 address. Then, a pseudo address corresponding to the IPv4 address is obtained by means of a hash algorithm, to encrypt the sensitive information.

For another example, when the source-end sensitive information corresponds to an IPv6 address, according to the encryption method, the source-end sensitive information is taken as an entire character string for encryption. The encryption algorithm adopted in this process includes, but not limited to, the MD5. Since the source-end sensitive information is an IPv6 address, a 128-bit address space needs to be reserved.

For still another example, when the source-end sensitive information is too long, according to an encryption policy, second encryption processing is performed on the source-end sensitive information to reduce the number of bits of the encrypted ciphertext sensitive information.

In an embodiment, the length of the source-end sensitive information may be determined by the SIGNATURE in the first DNS request information, or may be determined by the length of data in the first EDNS additional option information in the first DNS request information.

At S1222, encryption processing is performed on the source-end sensitive information according to the first encryption policy information to obtain the ciphertext sensitive information, where the ciphertext sensitive information has a length matching the first ciphertext length.

In this step, encryption processing is performed on the source-end sensitive information according to the first encryption policy information to obtain the ciphertext sensitive information. For example, when the source-end sensitive information corresponds to an IPv4 address, the first encryption policy information is configured as first encryption policy information corresponding to the IPv4 address. In an embodiment, domain name fields in the IPv4 form are first extracted from the source-end sensitive information, and then converted into integer real numbers through a character string conversion function. The converted integer real numbers may be limited to 0 to 15 through numerical restriction. Since the encrypted pseudo address is also an IPv4 address, a 32-bit address space needs to be reserved. The converted integer real numbers are further converted into four 4-bit binary numbers with remaining address space padded with zero, and 8-bit binary numbers are taken from the beginning each time and converted into decimal numbers to obtain the IPv4 address. Then, a pseudo address corresponding to the IPv4 address is obtained by means of a hash algorithm, to encrypt the sensitive information.

In addition, when the source-end sensitive information corresponds to an IPv6 address, the first encryption policy information is configured as first encryption policy information corresponding to the IPv6 address, and the source-end sensitive information is taken as an entire character string for encryption. The encryption algorithm adopted in this process includes, but not limited to, MD5. Since the source-end sensitive information is an IPv6 address, a 128-bit address space needs to be reserved.

In an embodiment, the first DNS request information is constructed based on a PADR type message body of the embodiment of the present disclosure, and the type of the source-end sensitive information can be known from the first DNS request information. For example, if the source-end sensitive information corresponds to an IPv4 address, the FAMILY field of the second DNS request information is assigned a value of 1, and if the source-end sensitive information corresponds to an IPv6 address, the FAMILY field of the second DNS request information is assigned a value of 2.

In an embodiment, the type of the source-end sensitive information is determined from the FAMILY field of the first DNS request information. For example, when the FAMILY field of the first DNS request information is assigned a value of 1, the source-end sensitive information corresponds to an IPv4 address, and when the FAMILY field of the first DNS request information is assigned a value of 2, the source-end sensitive information corresponds to an IPv6 address.

Figure 11:
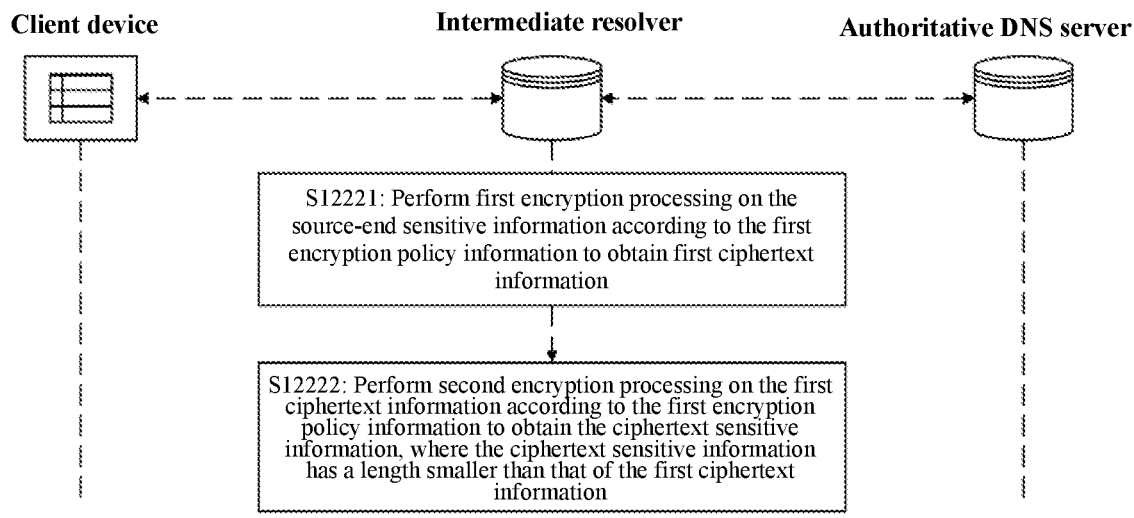
FIG. 11 is a flowchart of an example method of S1222 in FIG. 10.

FIG. 11 is a flowchart illustrating example processes of S1222 in FIG. 10, i.e., S1222 is further illustrated in FIG. 11. When the first DNS request information does not include the first EDNS additional option information, S1222 may include, but not limited to, steps S12221 and S12222.

At S12221, first encryption processing is performed on the source-end sensitive information according to the first encryption policy information to obtain first ciphertext information.

In this step, first encryption processing is performed on the source-end sensitive information according to the first encryption policy information to obtain the first ciphertext information which may be an IP address obtained according to the source-end sensitive information. For example, when the source-end sensitive information corresponds to an IPv4 address, the first encryption policy information is configured as first encryption policy information corresponding to the IPv4 address. In an embodiment, domain name fields in the IPv4 form are first extracted from the source-end sensitive information, and then converted into integer real numbers through a character string conversion function. The converted integer real numbers may be limited to 0 to 15 through numerical restriction. Since the encrypted pseudo address is also an IPv4 address, a 32-bit address space needs to be reserved. The converted integer real numbers are further converted into four 4-bit binary numbers with remaining address space padded with zero, and 8-bit binary numbers are taken from the beginning each time and converted into decimal numbers to obtain the IPv4 address. For another example, when the source-end sensitive information corresponds to an IPv6 address, the first encryption policy information is configured as first encryption policy information corresponding to the IPv6 address, and a 128-bit IPv6 address is obtained by performing first encryption processing on the source-end sensitive information.

At S12222, second encryption processing is performed on the first ciphertext information according to the first encryption policy information to obtain the ciphertext sensitive information, where the ciphertext sensitive information has a smaller length than the first ciphertext information.

In this step, second encryption processing is performed on the first ciphertext information according to the first encryption policy information to obtain the ciphertext sensitive information. For example, domain name fields in an IPv4 form are first extracted from the source-end sensitive information, and then converted into integer real numbers through a character string conversion function. The converted integer real numbers may be limited to 0 to 15 through numerical restriction. Since the encrypted pseudo address is also an IPv4 address, a 32-bit address space needs to be reserved. The converted integer real numbers are further converted into four 4-bit binary numbers with remaining address space padded with zero, and 8-bit binary numbers are taken from the beginning each time and converted into decimal numbers to obtain the IPv4 address. Then, a pseudo address corresponding to the IPv4 address is obtained by means of second encryption processing, to encrypt the sensitive information. Due to the limitation of the number of address bits, if the IPv4 address still exceeds 32 bits after one second encryption processing, at least another one second encryption processing needs to be performed again to prevent information loss due to the fact that the encrypted sensitive information has a larger length than the first ciphertext information.

For another example, when the source-end sensitive information corresponds to an IPv6 address, the first encryption policy information is configured as first encryption policy information corresponding to the IPv6 address, and the source-end sensitive information is taken as an entire character string for encryption. The encryption algorithm adopted in this process includes, but not limited to, MD5. Since the source-end sensitive information corresponds to the IPv6 address, a 128-bit address space needs to be reserved. If the IPv6 address obtained from the source-end sensitive information after the first encryption processing still exceeds 128 bits after one second encryption processing, at least another one second encryption processing needs to be performed to prevent information loss due to the fact that the encrypted sensitive information has a larger length than the first ciphertext information.

In an embodiment, the algorithm adopted for second encryption processing includes, but not limited to, the hash algorithm or the MD5.

In an embodiment, after the ciphertext sensitive information is encrypted, the ECRYPTION TYPE field is set according to the type of the encryption algorithm adopted to encrypt the sensitive information. For example, when the sensitive information is not encrypted, the ECRYPTION TYPE field is assigned a value of 0, when MD5 is adopted to encrypt sensitive information, the ECRYPTION TYPE field is assigned a value of 1, and when SHA-1 is adopted, the CRYPTION TYPE field is assigned a value of 2.

Figure 12:
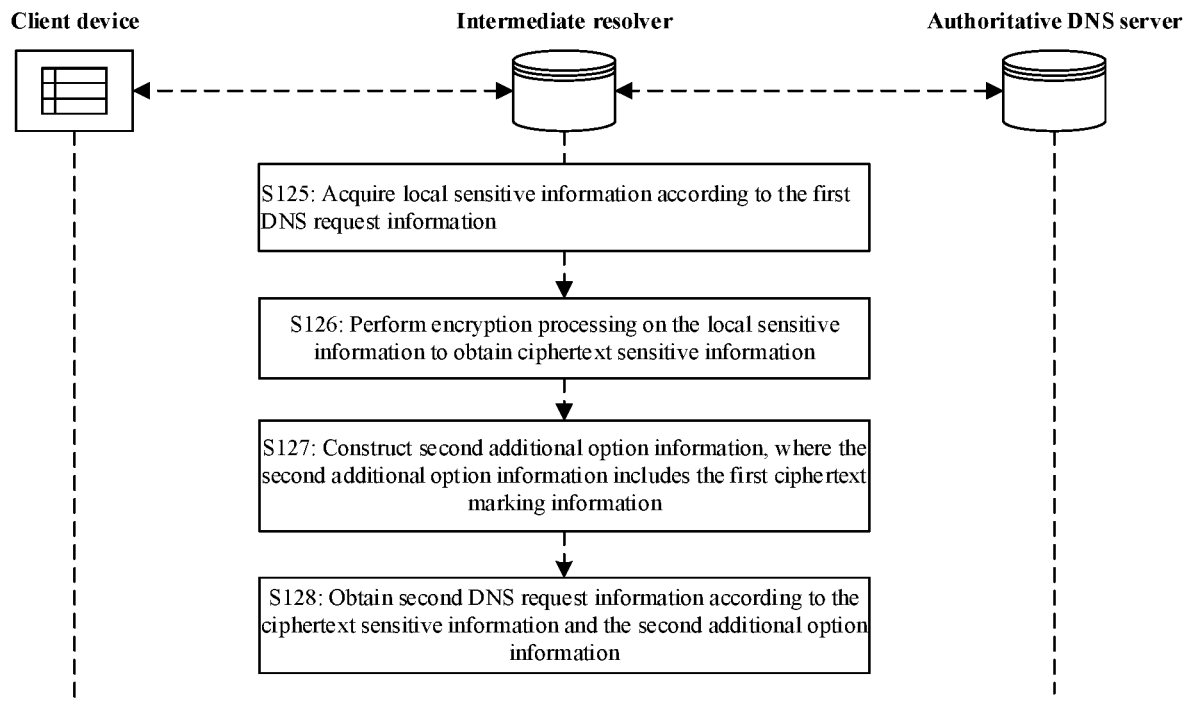
FIG. 12 is a flowchart of another example method of S120 in FIG. 2.

FIG. 12 is a flowchart illustrating another example method of S120 in FIG. 2, i.e., S120 is further illustrated in FIG. 12. When the first DNS request information does not include the first EDNS additional option information, S120 may include, but not limited to, steps S125, S126, S127 and S128.

At S125, local sensitive information is acquired according to the first DNS request information.

In this step, the intermediate resolver first detects whether the acquired first DNS request information carries sensitive information. Since the sensitive information is carried in the ECS option information, it can be determined whether the first DNS request information carries sensitive information by detecting whether the first DNS request information includes the first EDNS additional option information. When the first DNS request information does not carry sensitive information, the intermediate resolver acquires local sensitive information. The local sensitive information includes, but not limited to, an IP address of the intermediate resolver and a hardware identification code of the intermediate resolver.

At S126, encryption processing is performed on the local sensitive information to obtain the ciphertext sensitive information.

It should be noted that the encryption algorithm adopted to perform encryption processing on the local sensitive information may be a symmetric encryption algorithm, an advanced encryption standard or other encryption algorithms, which may be appropriately selected according to actual application situations, and will not be limited in this embodiment. Symmetric encryption algorithm refers to an encryption algorithm which adopts the same key for encryption and decryption, and the sender and receiver need to agree on a public key prior to conducting secure communication. Advanced encryption standard, also known as Rijndael encryption algorithm, is a block encryption standard, which can support a wider range of blocks and key lengths.

It should be noted that the encryption algorithm or encryption policy and other information adopted to perform encryption processing on sensitive data may be included in the intermediate resolver, or may be obtained by the intermediate resolver from other places, for example, from the authoritative DNS server or from the first DNS request information, which will not be limited in this embodiment.

In an embodiment, the encrypted ciphertext sensitive information is stored in the SIGNATURE field of the PADR field of the second DNS request information.

In an embodiment, the second DNS request information includes ECS option information, and the encrypted ciphertext sensitive information is stored in the ECS option information.

In an embodiment, the second DNS request information includes an ECRYPTION TYPE field which is used to indicate the type of an encryption algorithm adopted to encrypt the sensitive information. For example, when the sensitive information is not encrypted, the ECRYPTION TYPE field is assigned a value of 0, when the MD5 is adopted to encrypt sensitive information, the ECRYPTION TYPE field is assigned a value of 1, and when the SHA-1 is adopted, the CRYPTION TYPE field is assigned a value of 2.

At S127, second additional option information is constructed, where the second additional option information includes the first ciphertext marking information.

In this step, the second additional option information includes the first ciphertext marking information which is used to indicate that the ciphertext sensitive information is ciphertext information. After receiving the second DNS request information, the authoritative DNS server first detects whether the second DNS request information carries the first ciphertext marking information, and in the case where the authoritative DNS server detects the first ciphertext marking information, the authoritative DNS server decrypts the ciphertext sensitive information.

In an embodiment, the first DNS request information is constructed according to the ECS option protocol, and the second additional option information may be included in the ECS option information.

In an embodiment, the second additional option information is stored in the message body substructure of the RDATA element of the second DNS request information.

In an embodiment, the first DNS request information is constructed according to the ECS option protocol, and the second additional option information may be included in the ECS option information.

In an embodiment, the first ciphertext marking information is stored in the OPTION-CODE field of the second DNS request information, and the OPTION-CODE field in the embodiment of the present disclosure is used to indicate whether the DNS request information carries the encrypted ciphertext sensitive information, that is, indicate whether the DNS request information carries the pseudo address obtained by encrypting the IP address of the client device or the IP address of the intermediate resolver.

At S128, second DNS request information is obtained according to the ciphertext sensitive information and the second additional option information.

In this step, the ciphertext sensitive information and the second additional option information in the first DNS request information are combined to form the second DNS request information. Since in the scheme of the embodiment of the present disclosure, by transmitting the second DNS request information including the ciphertext sensitive information and the first ciphertext marking information, it is not required to perform encryption processing on the entire first DNS request information, so that the network resource overhead can be reduced while preventing the exposure of sensitive information to security risks, thereby reducing maintenance costs of the devices. In addition, since the first ciphertext marking information is used to indicate that the ciphertext sensitive information is ciphertext information, the authoritative DNS server can perform appropriate decryption processing on the ciphertext sensitive information according to the first ciphertext marking information, so that the processing accuracy of the second DNS request information by the authoritative DNS server can be improved.

It should be noted that the ciphertext sensitive information and the second additional option information in the embodiment of the present disclosure do not have to be parallel. For example, the ciphertext sensitive information and the second additional option information may be stored in two different fields in the second DNS request information. For another example, the ciphertext sensitive information may be included in the second additional option information, so that the ciphertext sensitive information and the second additional option information can be stored in the same field in the second DNS request information.

In an embodiment, the second additional option information includes a second encryption signature field.

Figure 13:
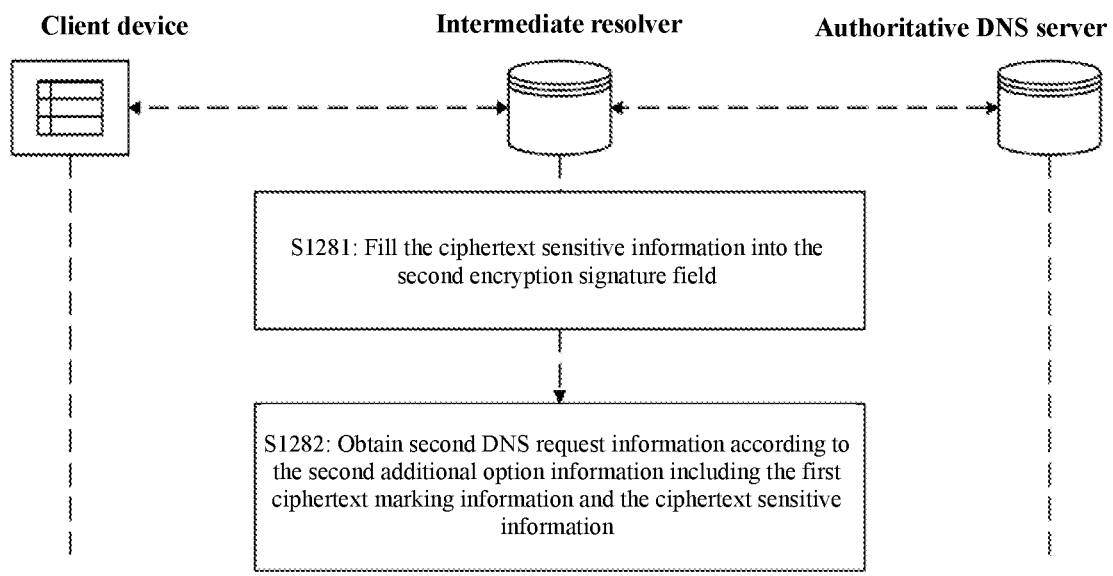
FIG. 13 is a flowchart of an example method of S128 in FIG. 12.

FIG. 13 is a flowchart illustrating example processes of S128 in FIG. 12. As shown in FIG. 13, S128 may include, but not limited to, steps S1281 and S1282.

At S1281, the ciphertext sensitive information is filled into the second encryption signature field.

In this step, the ciphertext sensitive information is filled into the second encryption signature field, and the second encryption signature field is included in the second additional option information. The second additional option information may be generated according to the ECS option protocol or may be generated according to the ECS protocol.

After acquiring the second DNS request information, the authoritative DNS server resolves the second DNS request information to obtain second additional option information, and acquires the ciphertext sensitive information by detecting the second encryption signature field in the second additional option information.

In an embodiment, the ciphertext sensitive information is filled into the SIGNATURE field of the second DNS request information.

At S1282, second DNS request information is obtained according to the second additional option information including the first ciphertext marking information and the ciphertext sensitive information.

In this step, after acquiring the second DNS request information, the authoritative DNS server resolves the second DNS request information to obtain the second additional option information, and acquires the ciphertext sensitive information by detecting the second encryption signature field in the second additional option information.

Figure 14:
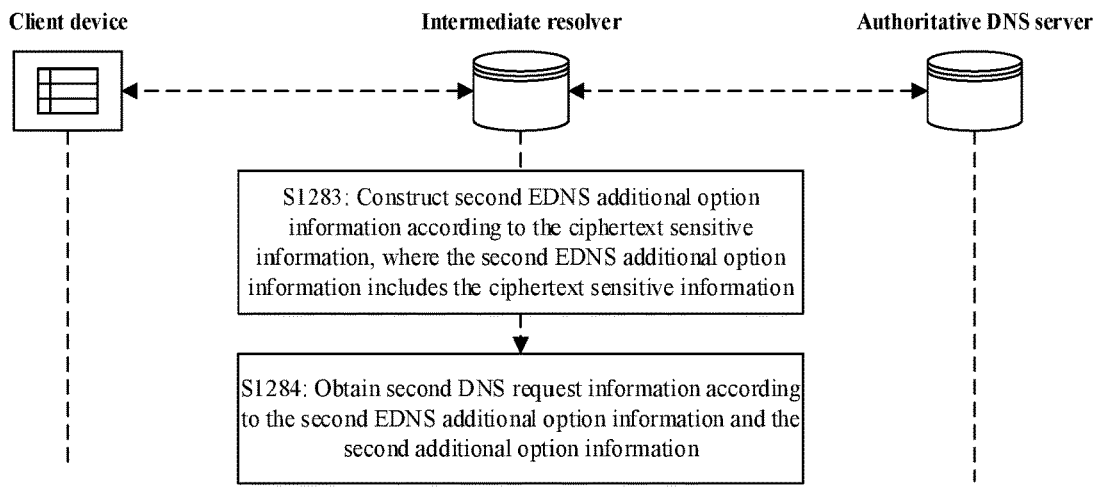
FIG. 14 is a flowchart of another example method of S128 in FIG. 12.

FIG. 14 is a flowchart illustrating another example method of S128 in FIG. 12. As shown in FIG. 14, S128 may further include, but not limited to, steps S1283 and S1284.

At S1283, second EDNS additional option information is constructed according to the ciphertext sensitive information, where the second EDNS additional option information includes the ciphertext sensitive information.

In this step, the second EDNS additional option information is constructed according to the ciphertext sensitive information. Therefore, for the second DNS request information, as compared with the first DNS request information, only the local sensitive information is encrypted, and the ciphertext sensitive information generated after the local sensitive information is encrypted is still included in the second EDNS additional option information. Therefore, encryption is not performed on the entire second DNS request information. As compared with the first DNS request information, the second DNS request information still has the same data structure as the first DNS request information. Therefore, encryption processing is not performed on the entire first DNS request information in the embodiment of the present disclosure, and the sensitive information can be encrypted separately to obtain the second DNS request information carrying ciphertext sensitive information so as to secure the sensitive information, so that a device in a transmission path does not need to support encryption and decryption processing on the entire DNS request information, thereby reducing the network resource overhead and the maintenance costs of the device.

In an embodiment, the ciphertext sensitive information is filled into the second EDNS additional option information. In addition, the second EDNS additional option information may also be used to save the key adopted for the encrypted ciphertext sensitive information.

In an embodiment, the ciphertext sensitive information may be stored in the ADDRESS field in the second EDNS additional option information.

At S1284, second DNS request information is obtained according to the second EDNS additional option information and the second additional option information.

In this step, the intermediate resolver obtains the second DNS request information according to the second additional option information. Since the ciphertext sensitive information generated after the local sensitive information is encrypted is still included in the second additional option information, encryption processing is not performed on the entire first DNS request information in the embodiment of the present application, and the sensitive information can be encrypted separately to obtain the second DNS request information carrying ciphertext sensitive information so as to secure the sensitive information, so that a device in a transmission path does not need to support encryption and decryption processing on the entire DNS request information, thereby reducing the network resource overhead and maintenance costs of the device.

In an embodiment, the first EDNS additional option information may store ciphertext sensitive information or store a key adopted for encrypting sensitive information, and the second additional option information includes a SIGNATURE field which may store ciphertext sensitive information or store a key adopted for encrypting sensitive information. Therefore, the second DNS request information is obtained according to the updated first EDNS additional option information and the first additional option information, where only the sensitive information of the second DNS request information other than the entire information is encrypted.

Figure 15:
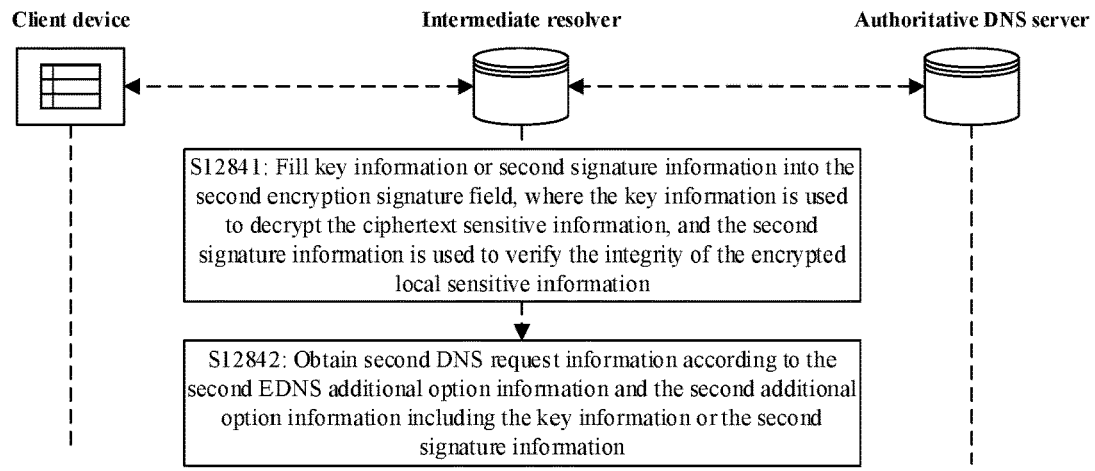
FIG. 15 is a flowchart of an example method of S1284 in FIG. 14.

FIG. 15 is a flowchart illustrating example processes of S1284 in FIG. 14. As shown in FIG. 15, S1284 may include, but not limited to, steps S12841 and S12842.

At S12841, key information or second signature information is filled into the second encryption signature field, where the key information is used to decrypt the ciphertext sensitive information, and the second signature information is used to verify the integrity of the encrypted local sensitive information.

In this step, the key information may be a public key adopted when encrypting the sensitive information, and the authoritative DNS server can decrypt the ciphertext sensitive information according to the key information. In addition, the key information may also reflect the encryption algorithm adopted when encrypting the sensitive information. The second signature information may be configured to verify the encrypted local sensitive information to ensure the integrity of the local sensitive information.

In an embodiment, the SIGNATURE field of the second DNS request information may also be used to store the public key adopted for encrypting sensitive information.

At S12842, second DNS request information is obtained according to the second EDNS additional option information and the second additional option information including the key information or the second signature information.

In this step, for the second DNS request information, as compared with the first DNS request information, the second additional option information carries the ciphertext sensitive information. Therefore, encryption processing is not performed on the entire first DNS request information in the embodiment of the present disclosure, and the sensitive information can be encrypted separately to obtain the second DNS request information carrying the ciphertext sensitive information so as to secure the sensitive information, so that a device in a transmission path does not need to support encryption and decryption processing on the entire DNS request information, thereby reducing the network resource overhead and maintenance costs of the device.

Figure 16:
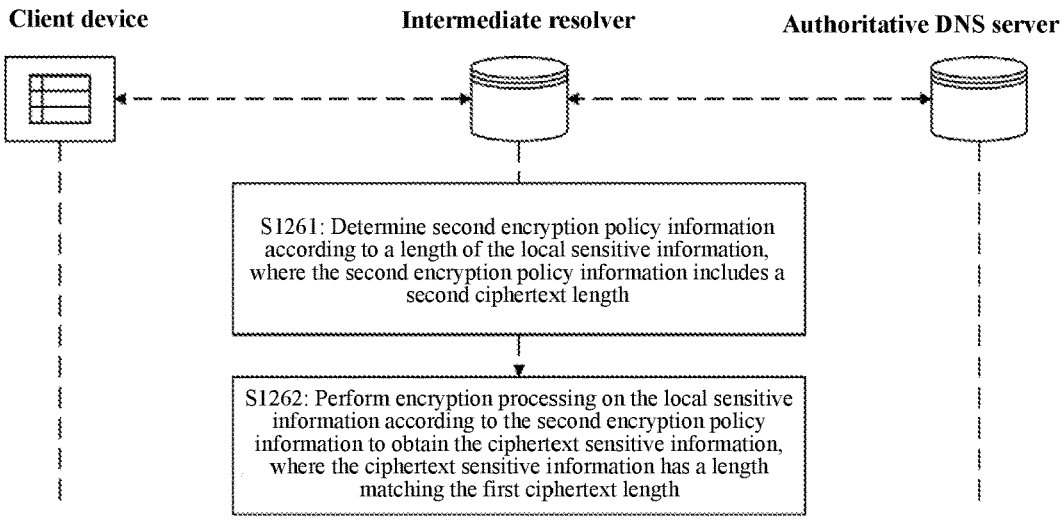
FIG. 16 is a flowchart of an example method of S126 in FIG. 12.

FIG. 16 is a flowchart illustrating example processes of S126 in FIG. 12. As shown in FIG. 16, S126 may include, but not limited to, steps S1261 and S1262.

At S1261, second encryption policy information is determined according to a length of the local sensitive information, where the second encryption policy information includes a second ciphertext length.

In this step, the second encryption policy information is determined according to the length of the local sensitive information. When the local sensitive information corresponds to an Internet Protocol version 4 (IPv4) address, the intermediate resolver can determine that the source-end sensitive information type is an IPv4 address by detecting the length of the local sensitive information, and configure the second encryption policy information as second encryption policy information corresponding to the IPv4 address. When the local sensitive information corresponds to an Internet Protocol version 6 (IPv6) address, the intermediate resolver can determine that the source-end sensitive information type is an IPv6 address by detecting the length of the local sensitive information, and configure the second encryption policy information as second encryption policy information corresponding to the IPv6 address.

In an embodiment, in addition to the first ciphertext length, the second encryption policy information further includes an encryption method for the local sensitive information. For example, when the local sensitive information corresponds to an IPv4 address, according to the encryption method, domain name fields in the IPv4 form are first extracted from the local sensitive information, and then converted into integer real numbers through a character string conversion function. The converted integer real numbers may be limited to 0 to 15 through numerical restriction. Since the encrypted pseudo address is also an IPv4 address, a 32-bit address space needs to be reserved. The converted integer real numbers are further converted into four 4-bit binary numbers with remaining address space padded with zero, and 8-bit binary numbers are taken from the beginning each time and converted into decimal numbers to obtain the IPv4 address. Then, a pseudo address corresponding to the IPv4 address is obtained by means of a hash algorithm, to encrypt the sensitive information.

For another example, when the local sensitive information corresponds to an IPv6 address, according to the encryption method, the local sensitive information is taken as an entire character string for encryption. The encryption algorithm adopted in this process includes, but not limited to, the Message-Digest Algorithm 5 (MD5). Since the local sensitive information is an IPv6 address, a 128-bit address space needs to be reserved.

For yet another example, when the local sensitive information is too long, according to the encryption method, second encryption processing is performed on the local sensitive information to reduce the number of bits of the encrypted ciphertext sensitive information.

At S1262, encryption processing is performed on the local sensitive information according to the second encryption policy information to obtain the ciphertext sensitive information, where the ciphertext sensitive information has a length matching the first ciphertext length.

In this step, encryption processing is performed on the local sensitive information according to the second encryption policy information to obtain the ciphertext sensitive information. For example, when the local sensitive information corresponds to an IPv4 address, the second encryption policy information is configured as second encryption policy information corresponding to the IPv4 address. In an embodiment, domain name fields in the IPv4 form are first extracted from the local sensitive information, and then converted into integer real numbers through a character string conversion function. The converted integer real numbers may be limited to 0 to 15 through numerical restriction. Since the encrypted pseudo address is also an IPv4 address, a 32-bit address space needs to be reserved. The converted integer real numbers are then converted into four 4-bit binary numbers with remaining address space padded with zero, and 8-bit binary numbers are taken from the beginning each time and converted into decimal numbers to obtain the IPv4 address. Then, a pseudo address corresponding to the IPv4 address is obtained by means of a hash algorithm, to encrypt the sensitive information.

In addition, when the local sensitive information corresponds to an IPv6 address, the second encryption policy information is configured as second encryption policy information corresponding to the IPv6 address, and the local sensitive information is taken as an entire character string for encryption. The encryption algorithm adopted in this process includes, but not limited to, the MD5. Since the local sensitive information is an IPv6 address, a 128-bit address space needs to be reserved.

In an embodiment, the first DNS request information is constructed based on a PADR type message body of the embodiment of the present disclosure, and the type of the local sensitive information can be known from the first DNS request information. For example, when the local sensitive information corresponds to an IPv4 address, the FAMILY field of the second DNS request information is assigned a value of 1, and when the local sensitive information corresponds to an IPv6 address, the FAMILY field of the second DNS request information is assigned a value of 2.

In an embodiment, the type of the local sensitive information is determined from the FAMILY field of the first DNS request information. For example, when the FAMILY field of the first DNS request information is assigned a value of 1, the local sensitive information corresponds to an IPv4 address, and when the FAMILY field of the first DNS request information is assigned a value of 2, the local sensitive information corresponds to an IPv6 address.

Figure 17:
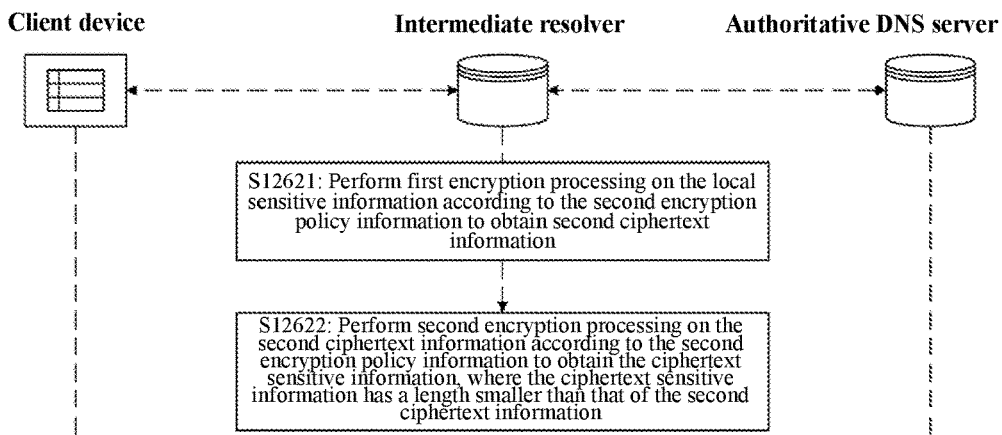
FIG. 17 is a flowchart of an example method of S1262 in FIG. 16.

FIG. 17 is a flowchart illustrating example processes of S1262 in FIG. 16. As shown in FIG. 17, S1262 may include, but not limited to, steps S12621 and S12622.

At S12621, first encryption processing is performed on the local sensitive information according to the second encryption policy information to obtain second ciphertext information.

In this step, first encryption processing is performed on the local sensitive information according to the second encryption policy information to obtain the second ciphertext information which may be an IP address obtained according to the local sensitive information. For example, when the local sensitive information corresponds to an IPv4 address, the second encryption policy information is configured as second encryption policy information corresponding to the IPv4 address. To be specific, domain name fields in the IPv4 form are first extracted from the local sensitive information, and then converted into integer real numbers through a character string conversion function. The converted integer real numbers may be limited to 0 to 15 through numerical restriction. Since the encrypted pseudo address is also an IPv4 address, a 32-bit address space needs to be reserved. The converted integer real numbers are further converted into four 4-bit binary numbers with remaining address space padded with zero, and 8-bit binary numbers are taken from the beginning each time and converted into decimal numbers to obtain the IPv4 address. For another example, when the local sensitive information corresponds to an IPv6 address, the second encryption policy information is configured as second encryption policy information corresponding to the IPv6 address, and a 128-bit IPv6 address is obtained by performing first encryption processing on the local sensitive information.

At S12622, second encryption processing is performed on the second ciphertext information according to the second encryption policy information to obtain the ciphertext sensitive information, where the ciphertext sensitive information has a smaller length than the second ciphertext information.

In this step, second encryption processing is performed on the second ciphertext information according to the second encryption policy information to obtain the ciphertext sensitive information. For example, domain name fields in the IPv4 form are first extracted from the local sensitive information, and then converted into integer real numbers through a character string conversion function. The converted integer real numbers may be limited to 0 to 15 through numerical restriction. Since the encrypted pseudo address is also an IPv4 address, a 32-bit address space needs to be reserved. The converted integer real numbers are further converted into four 4-bit binary numbers with remaining address space padded with zero, and 8-bit binary numbers are taken from the beginning each time and converted into decimal numbers to obtain the IPv4 address. Then, a pseudo address corresponding to the IPv4 address is obtained by means of second encryption processing, to encrypt the sensitive information. Due to the limitation of the number of address bits, if the IPv4 address still exceeds 32 bits after one second encryption processing, at least another one second encryption processing needs to be performed to prevent information loss due to the fact that the encrypted sensitive information has a larger length than the second ciphertext information.

For another example, when the local sensitive information corresponds to an IPv6 address, the second encryption policy information is configured as second encryption policy information corresponding to the IPv6 address, and the local sensitive information is taken as an entire character string for encryption. The encryption algorithm adopted in this process includes, but not limited to, MD5. Since the local sensitive information corresponds to the IPv6 address, a 128-bit address space needs to be reserved. If the IPv6 address obtained from the local sensitive information after the first encryption processing still exceeds 128 bits after one second encryption processing, at least another one second encryption processing needs to be performed to prevent information loss due to the fact that the encrypted sensitive information has a larger length than the second ciphertext information.

In an embodiment, the algorithm adopted for second encryption processing includes, but not limited to, the hash algorithm or the MD5.

In an embodiment, after the ciphertext sensitive information is encrypted, the ECRYPTION TYPE field is set according to the type of the encryption algorithm adopted to encrypt the sensitive information. For example, when the sensitive information is not encrypted, the ECRYPTION TYPE field is assigned a value of 0, when the MD5 is adopted to encrypt the sensitive information, the ECRYPTION TYPE field is assigned a value of 1, and when the Secure Hash Algorithm 1 (SHA-1) is adopted, the CRYPTION TYPE field is assigned a value of 2.

Figure 18:
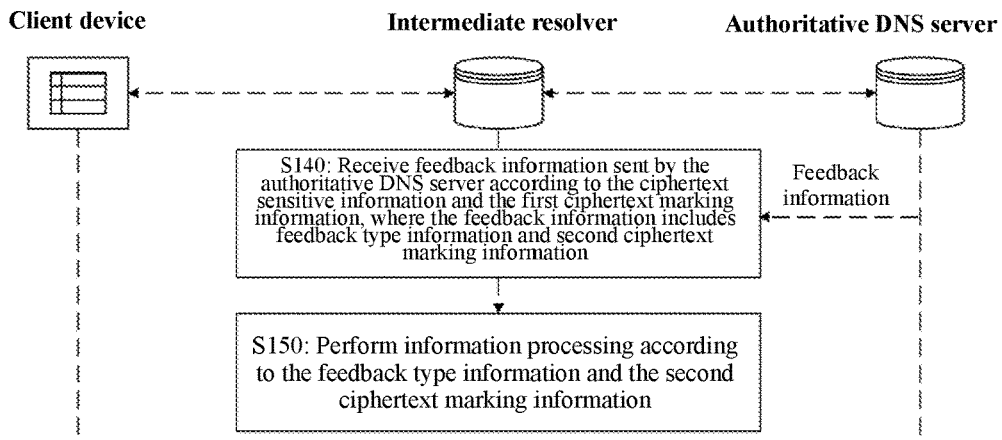
FIG. 18 is a flowchart of an information processing method provided by another embodiment of the present disclosure.

FIG. 18 is a flowchart illustrating an information processing method provided by another embodiment of the present disclosure. As shown in FIG. 18, the information processing method may further include, but not limited to, steps S140 and S150.

At S140, feedback information sent by the authoritative DNS server according to the ciphertext sensitive information and the first ciphertext marking information is received, where the feedback information includes feedback type information and second ciphertext marking information.

In this step, after receiving the second DNS request information, the authoritative DNS server generates feedback information according to the second DNS request information, and sends the feedback information to the client device. The feedback information is used to enable the client device to obtain a required corresponding relationship between a domain name and an IP address. In addition, the feedback information is also used to enable the intermediate resolver or the client device to know whether the authoritative DNS server successfully decrypts the ciphertext sensitive information in the second DNS request information.

In an embodiment, the feedback information is constructed according to a PADR type message body structure in the embodiment of the present disclosure.

In an embodiment, the feedback information further includes ECS option information.

At S150, information processing is performed according to the feedback type information and the second ciphertext marking information.

In this step, the intermediate resolver performs information processing according to the feedback type information and the second ciphertext marking information carried by the feedback information, so that the intermediate resolver can perform further processing according to the processing condition of the authoritative DNS server.

Figure 19:
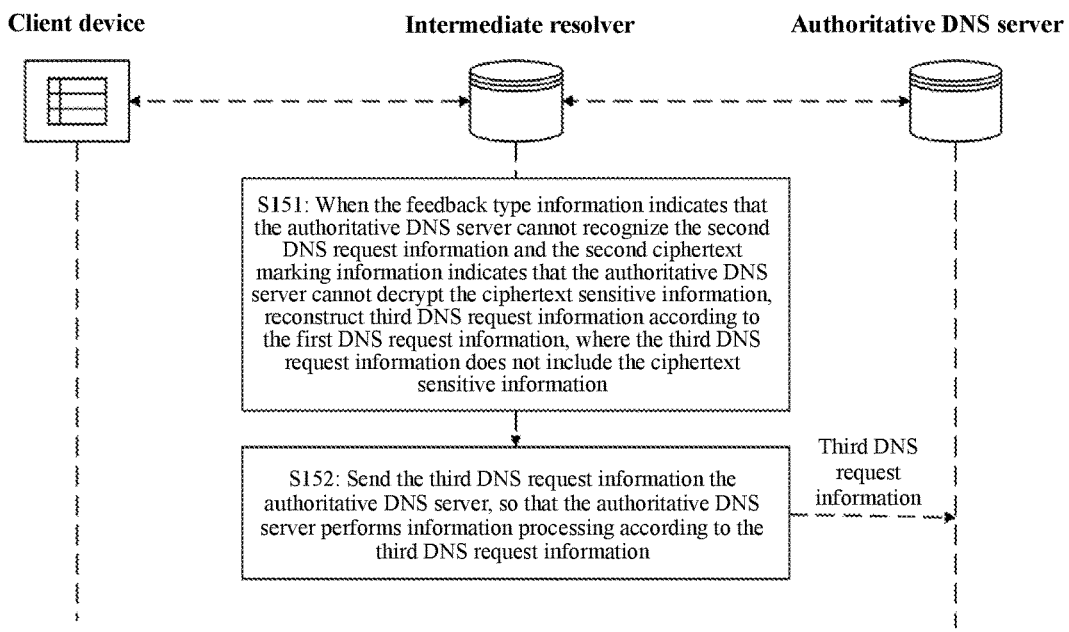
FIG. 19 is a flowchart of an example method of S150 in FIG. 18.

FIG. 19 is a flowchart illustrating example processes of S150 in FIG. 18. As shown in FIG. 19, S150 may include, but not limited to, steps S151 and S152.

At S151, when the feedback type information indicates that the authoritative DNS server cannot recognize the second DNS request information and the second ciphertext marking information indicates that the authoritative DNS server cannot decrypt the ciphertext sensitive information, third DNS request information is reconstructed according to the first DNS request information, where the third DNS request information does not include the ciphertext sensitive information.

In this step, when the feedback type information indicates that the authoritative DNS server cannot recognize the second DNS request information, the authoritative DNS server cannot decrypt the ciphertext sensitive information either. Therefore, the intermediate resolver reconstructs third DNS request information according to the first DNS request information, where the third DNS request information does not include the ciphertext sensitive information. When the feedback type information indicates that the authoritative DNS server cannot recognize the second DNS request information, for example, a corresponding authoritative DNS server does not support an ECS option or the corresponding authoritative DNS server does not pre-configure a corresponding decryption algorithm or the authoritative DNS server fails, the third DNS request information is reconstructed and is sent to the authoritative DNS server to detect the availability of the authoritative DNS server.

In an embodiment, the feedback information adopts the PADR type message body structure in the embodiment of the present disclosure. Therefore, it can be determined whether the authoritative DNS server can recognize the second DNS request information and decrypt the ciphertext sensitive information in the second DNS request information by checking the ECRYPTION FLAG field in the feedback information.

In an embodiment, when a FLAG bit in the ECRYPTION FLAG field of the feedback information is 0, it indicates that the authoritative DNS server cannot recognize the second DNS request information and decrypt the ciphertext sensitive information in the second DNS request information.

In an embodiment, when it is detected that the currently selected authoritative DNS server fails, a new authoritative DNS server is selected.

It should be noted that the third DNS request information may or may not carry the second additional option information and/or the first EDNS additional option information, which will not be limited in this embodiment.

It should be noted that the third DNS request information may or may not carry the second additional option information and/or the second EDNS additional option information, which will not be limited in this embodiment.

At S152, the third DNS request information is sent to the authoritative DNS server, so that the authoritative DNS server performs information processing according to the third DNS request information.

In this step, the intermediate resolver sends the third DNS request information to the authoritative DNS server, so that the authoritative DNS server performs information processing according to the third DNS request information.

Figure 20:
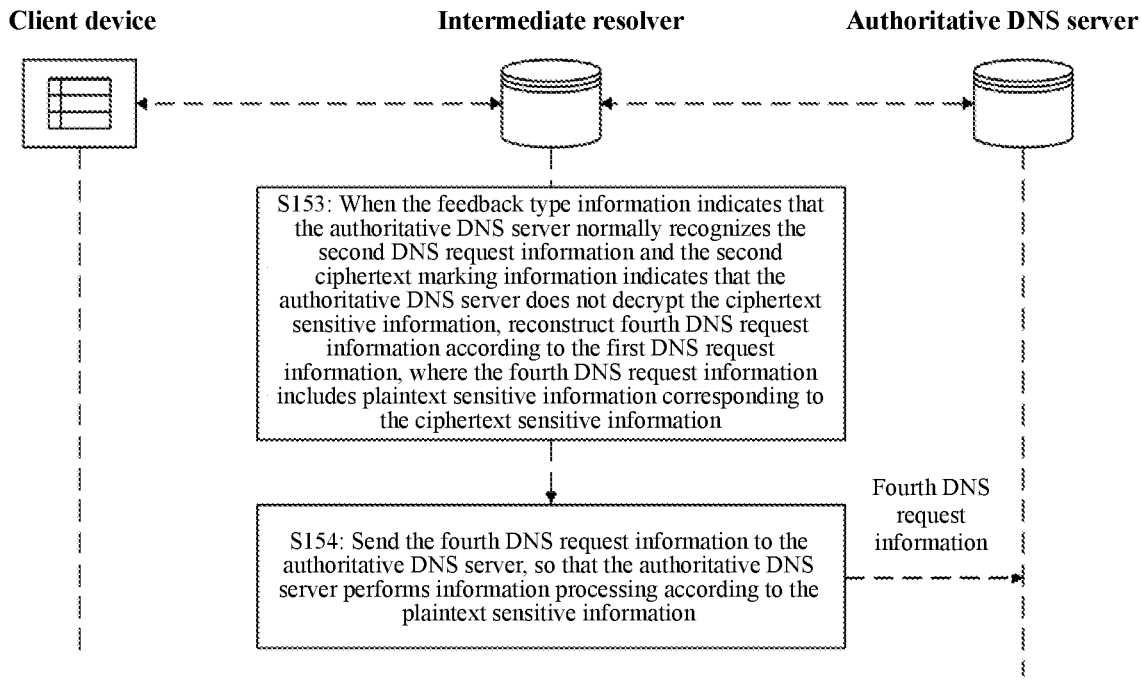
FIG. 20 is a flowchart of another example method of S150 in FIG. 18.

FIG. 20 is a flowchart illustrating another example method of S150 in FIG. 18. As shown in FIG. 20, S150 may include, but not limited to, steps S153 and S154.

At S153, when the feedback type information indicates that the authoritative DNS server normally recognizes the second DNS request information and the second ciphertext marking information indicates that the authoritative DNS server does not decrypt the ciphertext sensitive information, fourth DNS request information is reconstructed according to the first DNS request information, where the fourth DNS request information includes plaintext sensitive information corresponding to the ciphertext sensitive information.

In this step, when the feedback type information indicates that the authoritative DNS server cannot recognize the second DNS request information, the authoritative DNS server cannot decrypt the ciphertext sensitive information either. Therefore, the intermediate resolver reconstructs fourth DNS request information according to the first DNS request information, where the fourth DNS request information includes plaintext sensitive information corresponding to ciphertext sensitive information. When the feedback type information indicates that the authoritative DNS server cannot recognize the second DNS request information, for example, a corresponding authoritative DNS server does not support an ECS option or the corresponding authoritative DNS server does not pre-configure a corresponding decryption algorithm, the fourth DNS request information which uses plaintext to record sensitive information is reconstructed, and the fourth DNS request information is sent to the authoritative DNS server to improve compatibility.

In an embodiment, the feedback information adopts the PADR type message body structure in the embodiment of the present disclosure. Therefore, it can be determined whether the authoritative DNS server can recognize the second DNS request information and decrypt the ciphertext sensitive information in the second DNS request information by checking the ECRYPTION FLAG field in the feedback information.

In an embodiment, when a FLAG bit in the ECRYPTION FLAG field of the feedback information is 2, it indicates that the authoritative DNS server can recognize the second DNS request information, but cannot decrypt the ciphertext sensitive information in the second DNS request information.

It should be noted that the fourth DNS request information may or may not carry the second additional option information and/or the first EDNS additional option information, which will not be limited in this embodiment.

It should be noted that the fourth DNS request information may or may not carry the second additional option information and/or the second EDNS additional option information, which will not be limited in this embodiment.

At S154, the fourth DNS request information is sent to the authoritative DNS server, so that the authoritative DNS server performs information processing according to the plaintext sensitive information.

In this step, the intermediate resolver sends the fourth DNS request information to the authoritative DNS server, so that the authoritative DNS server performs information processing according to the plaintext sensitive information carried in the fourth DNS request information.

In an embodiment, the feedback information further includes a target IP address, which an IP address corresponding to the first DNS request information.

Figure 21:
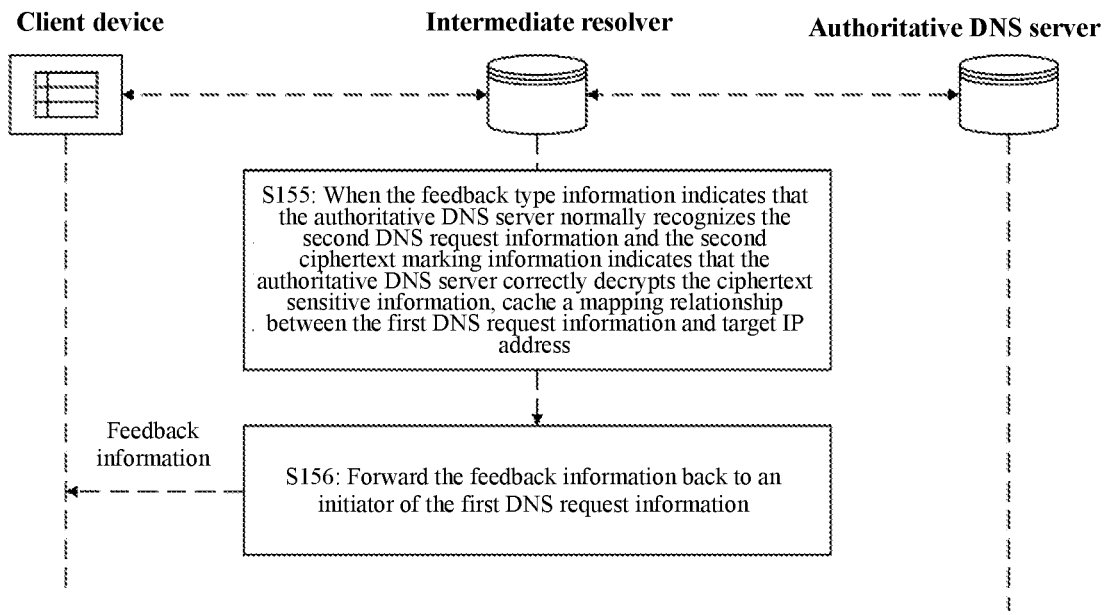
FIG. 21 is a flowchart of another example method of S150 in FIG. 18.

FIG. 21 is a flowchart illustrating another example method of S150 in FIG. 18. As shown in FIG. 21, S150 may include, but not limited to, steps S155 and S156.

At S155, when the feedback type information indicates that the authoritative DNS server normally recognizes the second DNS request information and the second ciphertext marking information indicates that the authoritative DNS server correctly decrypts the ciphertext sensitive information, a mapping relationship between the first DNS request information and the target IP address is cached.

In this step, when the feedback type information indicates that the authoritative DNS server normally recognizes the second DNS request information and the second ciphertext marking information indicates that the authoritative DNS server correctly decrypts the ciphertext sensitive information, it is proved that the authoritative DNS server can normally recognize the second DNS request information and can decrypt the ciphertext sensitive information in the second DNS request information. By caching the mapping relationship between the first DNS request information and the target IP address in the intermediate resolver, the efficiency of acquiring the mapping relationship between the first DNS request information and the target IP address by the client device can be improved, and the complexity of system scheduling is reduced.

In an embodiment, the feedback information adopts the PADR type message body structure in the embodiment of the present disclosure. Therefore, it can be determined whether the authoritative DNS server can recognize the second DNS request information and decrypt the ciphertext sensitive information in the second DNS request information by checking the ECRYPTION FLAG field in the feedback information.

In an embodiment, if a FLAG bit in the ECRYPTION FLAG field of the feedback information is 1, it indicates that the authoritative DNS server can recognize the second DNS request information, and can decrypt the ciphertext sensitive information.

At S156, the feedback information is forwarded back to an initiator of the first DNS request information.

In this step, the feedback information includes an IP address corresponding to the first DNS request information. By forwarding the feedback information back to the initiator of the first DNS request information, the initiator of the first DNS request information can obtain the mapping relationship between the first DNS request information and the target IP address. In addition, the feedback information may be encrypted or unencrypted, which will not be limited in this embodiment.

It should be noted that the initiator of the first DNS request information may be a client device or an intermediate resolver, which will not be limited in this embodiment.

In order to more clearly illustrate the processing flow of the information processing method provided by the embodiment of the present disclosure, the processing flow is described below with examples.

Figure 22:
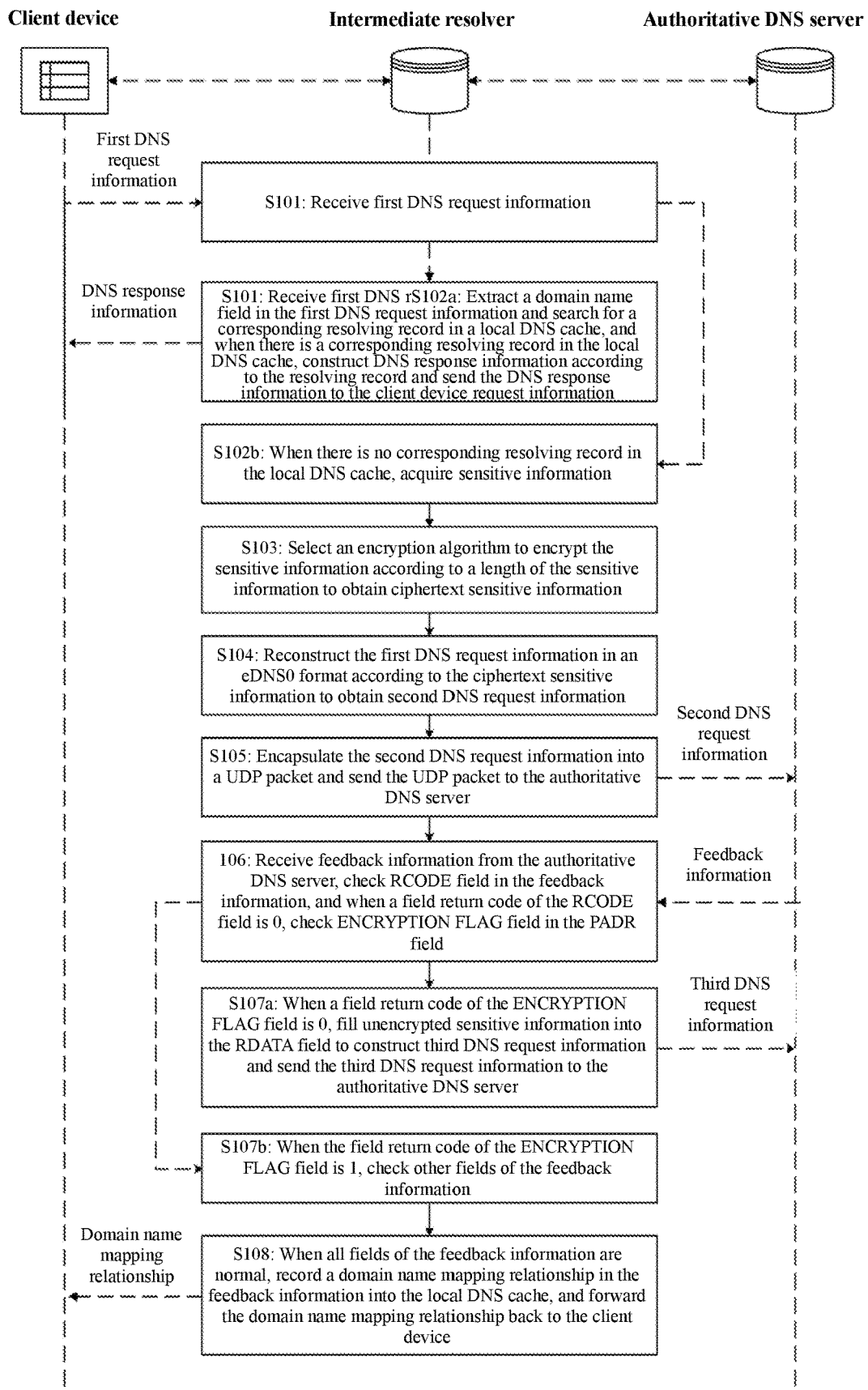
FIG. 22 is a flowchart of an information processing method provided by an example of the present disclosure.

FIG. 22 is a flowchart illustrating an information processing method provided by an example of the present disclosure. As shown in FIG. 22, the information processing method is applied to an intermediate resolver, and may include following steps S101 to S108.

At S101, first DNS request information is received.

At S102a, a domain name field in the first DNS request information is extracted and a corresponding resolving record is searched for in a local DNS cache, and when there is a corresponding resolving record in the local DNS cache, DNS response information is constructed according to the resolving record and sent to the client device.

At S102b, when there is no corresponding resolving record in the local DNS cache, sensitive information is acquired.

At S103, an encryption algorithm is selected according to a length of the sensitive information to encrypt the sensitive information so as to obtain ciphertext sensitive information.

At S104, the first DNS request information is reconstructed in an eDNS0 format according to the ciphertext sensitive information to obtain second DNS request information.

At S105, the second DNS request information is encapsulated into a UDP packet and sent to an authoritative DNS server.

At S106, feedback information is received from the authoritative DNS server, a RCODE field in the feedback information is checked, and when a field return code of the RCODE field is 0, an ENCRYPTION FLAG field in a PADR field is checked.

At S107a, when a field return code of the ENCRYPTION FLAG field is 0, unencrypted sensitive information is filled into the RDATA field to construct third DNS request information and the third DNS request information is sent to the authoritative DNS server.

At S107b, when the field return code of the ENCRYPTION FLAG field is 1, other fields of the feedback information are checked.

At S108, in the case where all fields of the feedback information are normal, a domain name mapping relationship in the feedback information is recorded into the local DNS cache and forwarded back to the client device.

It should be noted that an example method for selecting an encryption algorithm according to a length of the sensitive information in S103 includes: in the case where the sensitive information is targeted for mapping to a shorter IPv4 address, a 32-bit address space is reserved, and every four bits correspond to one integer. The sensitive information is converted into integer real numbers by a character string conversion function. The converted integer real numbers are further converted into four 4-bit binary numbers with remaining address space padded with zero, and 8-bit binary numbers are taken from the beginning each time and converted into decimal numbers to obtain the IPv4 address. In the process of reconstructing the second DNS request information in an eDNS0 format, an EXTENDED-RCODE field in a TTL element is set to 0x1, indicating that the DNS request information carries the ciphertext sensitive information. An OPTION-CODE field in the RDATA field is set to 27000, an OPTION-LENGTH field is set to 36, and a FAMILY field is set to 1, indicating that an IPv4 address format will be adopted subsequently. An ENCRYPTION TYPE field is set to 2, indicating that an encryption mechanism of crc32 ( ), bese_convert ( ) is adopted. The ENCRYPTION FLAG field is set to 0, and is adopted in the DNS request message, indicating that there is an encrypted pseudo address in the message and a remote-end DNS authoritative server cannot recognize this message by default. The encrypted ciphertext sensitive information or the key adopted in the encryption process is filled into a SIGNATURE field. In addition, the encrypted pseudo address may also be filled into an ADDRESS field of an ECS option information.

It should be noted that the example method for selecting an encryption algorithm according to a length of the sensitive information in S103 further includes: in the case where the sensitive information is targeted for mapping to a longer IPv6 address, a 128-bit address space is reserved. The sensitive information is converted into a 128-bit character string by means of MD5, and every four bits correspond to one character to obtain the IPv6 address. In the process of reconstructing the second DNS request information in an eDNS0 format, the EXTENDED-RCODE field in the TTL element is set to 0x1, indicating that the DNS request information carries the ciphertext sensitive information. The OPTION-CODE field in the RDATA field is set to 27000, the OPTION-LENGTH field is set to 132, and the FAMILY field is set to 2, indicating that an IPv6 address format will be adopted subsequently. The ENCRYPTION TYPE field is set to 1. The ENCRYPTION FLAG field is set to 0, and is adopted in the DNS request message, indicating that there is an encrypted pseudo address in the message and the remote-end DNS authoritative server cannot recognize this message by default. The encrypted ciphertext sensitive information or the key adopted in the encryption process is filled into the SIGNATURE field. In addition, the encrypted pseudo address may also be filled into the ADDRESS field of the ECS option information.

In addition, an embodiment of the present disclosure further provides an intermediate resolver. The intermediate resolver includes a memory, a processor and a computer program stored in the memory and executable by the processor.

The processor and the memory may be connected by a bus or in other manners.

As a non-transient computer-readable storage medium, the memory may be configured to store non-transient software programs and non-transient computer-executable programs. In addition, the memory may include a high-speed random access memory, and may also include a non-transient memory, such as at least one magnetic disk storage device, a flash memory device, or other non-transient solid state storage devices. In some implementations, the memory may optionally include memories remotely located with respect to the processor, and these remote memories may be connected to the processor through networks. Examples of the above networks include, but not limited to, the Internet, an intranet, a local area network, a mobile communication network and combinations thereof.

It should be noted that the intermediate resolver in this embodiment may be used as the intermediate resolver 120 in the embodiment shown in FIG. 1, and the intermediate resolver in this embodiment can form, for example, a part of the system architecture in the embodiment shown in FIG. 1. These embodiments all belong to the same inventive concept, and therefore have the same implementation principles and technical effects, which will not be described in detail here.

Non-transient software programs and instructions required to realize the data processing method in the above-mentioned embodiment are stored in the memory which, when executed by the processor, cause the processor to implement the data processing method in the above-mentioned embodiment, for example, the method steps S110 to S130 in FIGS. 2, S121 to S124 in FIGS. 6, S1241 to S1242 in FIGS. 7, S1243 to S1244 in FIGS. 8, S12441 to S12442 in FIGS. 9, S1221 to S1222 in FIGS. 10, S12221 to S12222 in FIGS. 11, S125 to S128 in FIGS. 12, S1281 to S1282 in FIGS. 13, S1283 to S1284 in FIGS. 14, S12841 to S12842 in FIGS. 15, S1261 to S1262 in FIGS. 16, S12621 to S12622 in FIGS. 17, S140 to S150 in FIGS. 18, S151 to S152 in FIGS. 19, S153 to S154 in FIGS. 20, S155 to S156 in FIG. 21 or S101 to S108 in FIG. 22.

In addition, an embodiment of the present disclosure further provides a network device. The network device includes the intermediate resolver in the above-mentioned embodiment. Therefore, the network device in this embodiment and the intermediate resolver in the above-mentioned embodiment belong to the same inventive concept, and therefore these embodiments have the same implementation principles and technical effects, which will not be described in detail here.

The device embodiments or system embodiments described above are merely illustrative, and the units described as separate components may or may not be physically separated, that is, they may be located in one place, or may be distributed onto multiple network elements. Some or all of the modules may be selected according to actual needs to achieve the purpose of this embodiment.

In addition, an embodiment of the present disclosure further provides a non-transitory computer-readable storage medium, storing a computer-executable instruction which, when executed by a processor or controller, for example, by a processor in the above-mentioned device embodiment, causes the above-mentioned processor to implement the data processing method in the above-mentioned embodiment, for example, the above-described method steps S110 to S130 in FIGS. 2, S121 to S124 in FIGS. 6, S1241 to S1242 in FIGS. 7, S1243 to S1244 in FIGS. 8, S12441 to S12442 in FIGS. 9, S1221 to S1222 in FIGS. 10, S12221 to S12222 in FIGS. 11, S125 to S128 in FIGS. 12, S1281 to S1282 in FIGS. 13, S1283 to S1284 in FIGS. 14, S12841 to S12842 in FIGS. 15, S1261 to S1262 in FIGS. 16, S12621 to S12622 in FIGS. 17, S140 to S150 in FIGS. 18, S151 to S152 in FIGS. 19, S153 to S154 in FIGS. 20, S155 to S156 in FIG. 21 or S101 to S108 in FIG. 22.

Those having ordinary skills in the art can understand that all or some of the steps, and systems in the method disclosed above may be implemented as software, firmware, hardware and appropriate combinations thereof. Some or all of the physical components may be implemented as software executed by a processor, such as a central processing unit, a digital signal processor or a microprocessor, or as hardware, or as an integrated circuit, such as an application specific integrated circuit. Such software may be distributed on a computer-readable medium, and the computer-readable medium may include a computer storage medium (or a non-transitory medium) and a communication medium (or a transitory medium). As is well known to those having ordinary skills in the art, the term "computer storage medium" includes volatile and nonvolatile, removable and non-removable media implemented in any method or technology for storing information such as computer-readable instructions, data structures, program modules or other data. The computer storage medium may include RAM, ROM, EEPROM, flash memory or other memory technologies, CD-ROM, Digital Versatile Disk (DVD) or other optical disk storage, magnetic cassette, magnetic tape, magnetic disk storage or other magnetic storage devices, or any other media that can be used to store desired information and can be accessed by a computer. In addition, as is well known to those having ordinary skills in the art that the communication medium may generally include computer-readable instructions, data structures, program modules or other data in a modulated data signal such as a carrier wave or other transmission mechanism, and may include any information delivery medium.

The above is a detailed description of the preferred implementations of the present disclosure, but the present disclosure is not limited thereto. Those having ordinary skills in the art can also make various equivalent modifications or substitutions without violating the essence of the present disclosure, and these equivalent modifications or substitutions are included in the scope defined by the claims of the present disclosure.

The invention claimed is:

1. An information processing method, which is applied to an intermediate resolver, the method comprising:
   receiving first Domain Name System (DNS) request information;
   obtaining, according to the first DNS request information, second DNS request information comprising ciphertext sensitive information and first ciphertext marking information for indicating the ciphertext sensitive information being ciphertext information; and
   sending the second DNS request information to an authoritative DNS server, so that the authoritative DNS server performs information processing according to the ciphertext sensitive information and the first ciphertext marking information.

2. The method of claim 1, wherein, the first DNS request information comprises first Extended Domain Name System (EDNS) additional option information comprising source-end sensitive information; and
   obtaining second DNS request information according to the first DNS request information comprises:
   acquiring the source-end sensitive information in the first EDNS additional option information;
   performing encryption processing on the source-end sensitive information to obtain the ciphertext sensitive information;
   constructing first additional option information comprising the first ciphertext marking information; and
   obtaining second DNS request information according to the ciphertext sensitive information and the first additional option information.

3. The method of claim 2, wherein, the first additional option information comprises a first encryption signature field; and
   obtaining second DNS request information according to the ciphertext sensitive information and the first additional option information, comprises:
   filling the ciphertext sensitive information into the first encryption signature field; and
   obtaining second DNS request information according to the first additional option information comprising the first ciphertext marking information and the ciphertext sensitive information.

4. The method of claim 2, wherein, obtaining second DNS request information according to the ciphertext sensitive information and the first additional option information, comprises:
  updating the source-end sensitive information in the first EDNS additional option information to the ciphertext sensitive information; and
  obtaining second DNS request information according to the updated first EDNS additional option information and the first additional option information.

5. The method of claim 4, wherein, the first additional option information comprises a first encryption signature field; and
  obtaining second DNS request information according to the updated first EDNS additional option information and the first additional option information, comprises:
    filling, key information for decrypting the ciphertext sensitive information, or first signature information for verifying the integrity of the encrypted source-end sensitive information, into the first encryption signature field; and
    obtaining second DNS request information according to the updated first EDNS additional option information and the first additional option information comprising the key information or the first signature information.

6. The method of claim 2, wherein, encrypting the source-end sensitive information to obtain the ciphertext sensitive information, comprises:
  determining first encryption policy information according to a length of the source-end sensitive information, wherein the first encryption policy information comprises a first ciphertext length; and
  performing encryption processing on the source-end sensitive information according to the first encryption policy information to obtain the ciphertext sensitive information having a length matched with it of the first ciphertext length.

7. The method of claim 6, wherein, performing encryption processing on the source-end sensitive information according to the first encryption policy information to obtain the ciphertext sensitive information, comprises:
  performing first encryption processing on the source-end sensitive information according to the first encryption policy information to obtain first ciphertext information; and
  performing second encryption processing on the first ciphertext information according to the first encryption policy information to obtain the ciphertext sensitive information having a length smaller than it of the first ciphertext information.

8. The method of claim 1, wherein, the first DNS request information does not comprise first EDNS additional option information; and
  obtaining second DNS request information according to the first DNS request information, comprises:
    acquiring local sensitive information according to the first DNS request information;
    performing encryption processing on the local sensitive information to obtain the ciphertext sensitive information;
    constructing second additional option information comprising the first ciphertext marking information; and
    obtaining second DNS request information according to the ciphertext sensitive information and the second additional option information.

9. The method of claim 8, wherein, the second additional option information comprises a second encryption signature field; and
  obtaining second DNS request information according to the ciphertext sensitive information and the second additional option information, comprises:
    filling the ciphertext sensitive information into the second encryption signature field; and
    obtaining second DNS request information according to the second additional option information comprising the first ciphertext marking information and the ciphertext sensitive information.

10. The method of claim 8, wherein, obtaining second DNS request information according to the ciphertext sensitive information and the second additional option information, comprises:
  constructing second EDNS additional option information comprising the ciphertext sensitive information, according to the ciphertext sensitive information; and
  obtaining the second DNS request information according to the second EDNS additional option information and the second additional option information.

11. The method of claim 10, wherein, the second additional option information comprises a second encryption signature field; and
  obtaining second DNS request information according to the second EDNS additional option information and the second additional option information, comprises:
    filling, key information for decrypting the ciphertext sensitive information, or second signature information for verifying the integrity of the encrypted local sensitive information, into the second encryption signature field; and
    obtaining the second DNS request information, according to the second EDNS additional option information and the second additional option information comprising the key information or the second signature information.

12. The method of claim 8, wherein, performing encryption processing on the local sensitive information to obtain the ciphertext sensitive information comprises:
  determining second encryption policy information comprising a second ciphertext length, according to a length of the local sensitive information; and
  performing encryption processing on the local sensitive information according to the second encryption policy information to obtain the ciphertext sensitive information having a length matched with it of the second ciphertext length.

13. The method of claim 12, wherein, performing encryption processing on the local sensitive information according to the second encryption policy information to obtain the ciphertext sensitive information, comprises:
  performing first encryption processing on the local sensitive information according to the second encryption policy information to obtain second ciphertext information; and
  performing second encryption processing on the second ciphertext information according to the second encryption policy information to obtain the ciphertext sensitive information having a length smaller than it of the second ciphertext information.

14. The method of claim 1, wherein, after sending the second DNS request information to an authoritative DNS server, the method further comprises:
  receiving feedback information comprising feedback type information and second ciphertext marking information, sent by the authoritative DNS server according to the ciphertext sensitive information and the first ciphertext marking information; and performing information processing according to the feedback type information and the second ciphertext marking information.

15. The method of claim 14, wherein, performing information processing according to the feedback type information and the second ciphertext marking information, comprises:

in response to the feedback type information indicating that the authoritative DNS server cannot recognize the second DNS request information and the second ciphertext marking information indicating that the authoritative DNS server cannot decrypt the ciphertext sensitive information, reconstructing third DNS request information not comprising the ciphertext sensitive information according to the first DNS request information; and sending the third DNS request information to the authoritative DNS server, so that the authoritative DNS server performs information processing according to the third DNS request information.

16. The method of claim 14, wherein, performing information processing according to the feedback type information and the second ciphertext marking information, comprises:

in response to, the feedback type information indicating that the authoritative DNS server normally recognizes the second DNS request information, and the second ciphertext marking information indicating that the authoritative DNS server does not decrypt the ciphertext sensitive information, reconstructing fourth DNS request information comprising plaintext sensitive information corresponding to the ciphertext sensitive information according to the first DNS request information; and sending the fourth DNS request information to the authoritative DNS server, so that the authoritative DNS server performs information processing according to the plaintext sensitive information.

17. The method of claim 14, wherein, the feedback information further comprises a target Internet Protocol (IP) address; and, performing information processing according to the feedback type information and the second ciphertext marking information, comprises:

caching a mapping relationship between the first DNS request information and the target IP address, in response to, the feedback type information indicating that the authoritative DNS server normally recognizes the second DNS request information, and the second ciphertext marking information indicating that the authoritative DNS server correctly decrypts the ciphertext sensitive information; and forwarding the feedback information back to an initiator of the first DNS request information.

18. An intermediate resolver, comprising a memory, a processor and a computer program stored in the memory and executable by the processor, wherein the computer program, when executed by the processor, causes the processor to perform an information processing method, which is applied to an intermediate resolver, and the method comprises:

receiving first Domain Name System (DNS) request information;

obtaining, according to the first DNS request information, second DNS request information comprising ciphertext sensitive information and first ciphertext marking information for indicating the ciphertext sensitive information being ciphertext information; and sending the second DNS request information to an authoritative DNS server, so that the authoritative DNS server performs information processing according to the ciphertext sensitive information and the first ciphertext marking information.

19. A network device, comprising the intermediate resolver of claim 18.

20. A non-transitory computer-readable storage medium storing a computer-executable instruction which, when executed by a processor, causes the processor to perform an information processing method, which is applied to an intermediate resolver, and the method comprises:

receiving first Domain Name System (DNS) request information;

obtaining, according to the first DNS request information, second DNS request information comprising ciphertext sensitive information and first ciphertext marking information for indicating the ciphertext sensitive information being ciphertext information; and sending the second DNS request information to an authoritative DNS server, so that the authoritative DNS server performs information processing according to the ciphertext sensitive information and the first ciphertext marking information.

* * * * *